United States Patent
Ishikura et al.

(10) Patent No.: US 11,146,967 B2
(45) Date of Patent: Oct. 12, 2021

(54) COMMUNICATION SYSTEM, BASE STATION DEVICE, TERMINAL DEVICE, COMMUNICATION METHOD, AND PROGRAM

(71) Applicant: SHARP KABUSHIKI KAISHA, Sakai (JP)

(72) Inventors: Katsutoshi Ishikura, Sakai (JP); Shuichi Takehana, Sakai (JP); Atsushi Yamazaki, Sakai (JP); Yuhsuke Takagi, Sakai (JP); Hideyuki Nakanishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 294 days.

(21) Appl. No.: 16/322,451

(22) PCT Filed: Aug. 4, 2017

(86) PCT No.: PCT/JP2017/028433
§ 371 (c)(1),
(2) Date: Jan. 31, 2019

(87) PCT Pub. No.: WO2018/030300
PCT Pub. Date: Feb. 15, 2018

(65) Prior Publication Data
US 2021/0105630 A1    Apr. 8, 2021

(30) Foreign Application Priority Data

Aug. 10, 2016 (JP) .................................. 2016-158138
Sep. 20, 2016 (JP) ............................. JP2016-183460

(51) Int. Cl.
*H04W 16/14* (2009.01)
*H04L 5/00* (2006.01)
(Continued)

(52) U.S. Cl.
CPC .......... *H04W 16/14* (2013.01); *H04L 5/0048* (2013.01); *H04W 16/32* (2013.01); *H04W 72/12* (2013.01)

(58) Field of Classification Search
CPC ..... H04W 16/14; H04W 16/32; H04W 72/12; H04L 5/0048
(Continued)

(56) References Cited

U.S. PATENT DOCUMENTS 8,750,886 B2 * 6/2014 Hakola ............. H04W 72/0486
455/450
10,972,942 B2 * 4/2021 Ibek ...................... H04L 9/3239
(Continued)

FOREIGN PATENT DOCUMENTS

JP    2012-044611 A    3/2012
JP    2014-099836 A    5/2014
(Continued)

OTHER PUBLICATIONS

LG Electronics et al., "WF on multi-subframe scheduling in LAA", R1-161409, 3GPP TSG RAN WG1 #84, St Julian's, Malta, Feb. 15-19, 2016.

*Primary Examiner* — Danh G Le
(74) *Attorney, Agent, or Firm* — ScienBiziP, P.C.

(57) ABSTRACT

A communication system is for improving utilization efficiency of radio resources. The communication system includes a base station device and a plurality of terminal devices that communicate with the base station device. The base station device includes a first control unit that assigns radio resources including at least one or more resource blocks to at least one of the plurality of terminal devices. The at least one of the plurality of terminal devices comprises a second control unit that transmits transmission data by using
(Continued)

at least some of the radio resources assigned to the at least one of the plurality of terminal devices.

15 Claims, 18 Drawing Sheets

(51) Int. Cl.
  *H04W 16/32* (2009.01)
  *H04W 72/12* (2009.01)
(58) Field of Classification Search
  USPC .................. 370/329; 455/450, 450.1, 550.1
  See application file for complete search history.

(56) References Cited

U.S. PATENT DOCUMENTS

| | | | | |
|---|---|---|---|---|
| 2007/0100480 | A1* | 5/2007 | Sinclair | G06F 1/3203 700/48 |
| 2007/0195731 | A1* | 8/2007 | Camp, Jr. | H04W 72/04 370/329 |
| 2009/0268680 | A1* | 10/2009 | Nam | H04W 64/00 370/329 |
| 2010/0007973 | A1* | 1/2010 | Sata | G02B 7/026 359/824 |
| 2011/0136495 | A1* | 6/2011 | Chen | H04L 5/0055 455/450 |
| 2013/0170480 | A1* | 7/2013 | Novak | H04L 1/1893 370/337 |
| 2013/0188564 | A1* | 7/2013 | Yu | H04W 72/1247 370/329 |
| 2014/0044024 | A1* | 2/2014 | Zou | H04W 76/14 370/280 |
| 2014/0220988 | A1* | 8/2014 | Miki | H04L 5/0037 455/450 |
| 2015/0237651 | A1 | 8/2015 | Nobusawa et al. | |
| 2015/0282129 | A1* | 10/2015 | Takeda | H04L 27/2643 370/329 |
| 2015/0373693 | A1* | 12/2015 | Wang | H04W 74/0833 370/329 |
| 2016/0135146 | A1 | 5/2016 | Schier et al. | |
| 2016/0338044 | A1* | 11/2016 | Yang | H04L 1/1816 |
| 2017/0064694 | A1* | 3/2017 | Wang | H04W 72/044 |
| 2017/0290046 | A1* | 10/2017 | Sun | H04J 11/0036 |
| 2017/0295570 | A1* | 10/2017 | Awad | H04W 4/70 |
| 2018/0295632 | A1* | 10/2018 | Goodman | H04W 28/04 |
| 2018/0343665 | A1* | 11/2018 | Yan | H04W 72/12 |
| 2019/0124670 | A1* | 4/2019 | Martin | H04W 72/12 |
| 2019/0200363 | A1* | 6/2019 | Rajendran | H04W 52/225 |

FOREIGN PATENT DOCUMENTS

| | | |
|---|---|---|
| JP | 2016-518740 A | 6/2016 |
| WO | 2015/149668 A1 | 10/2015 |

* cited by examiner

| SCHEDULING INFORMATION | VALUE |
|---|---|
| ASSIGNED RADIO RESOURCE | RESOURCE BLOCKS (1), (2), AND (3) |
| TERMINAL GROUP ID | A |

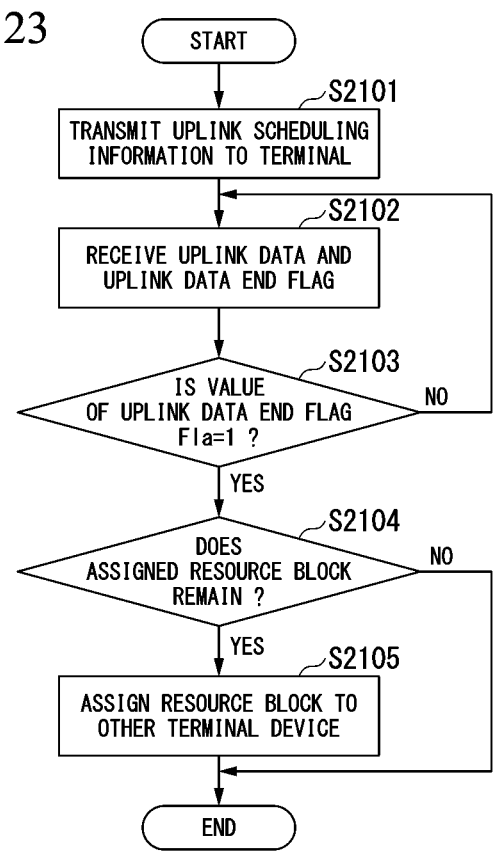

COMMUNICATION SYSTEM, BASE STATION DEVICE, TERMINAL DEVICE, COMMUNICATION METHOD, AND PROGRAM

TECHNICAL FIELD

Some aspects of the present invention relate to a communication system, a base station device, a terminal device, a communication method, and a program.

Priority is claimed on Japanese Patent Application No. 2016-158138, filed Aug. 10, 2016 and Japanese Patent Application No. 2016-183460, filed Sep. 20, 2016, the content of which is incorporated herein by reference.

BACKGROUND ART

First, first background art will be described.

In wireless communication systems using a Long Term Evolution (LTE) scheme, use of an unlicensed band is being studied. The unlicensed band is a frequency band for which licensing is not required in a case that a communication service is provided. Thus, there is a possibility that unlicensed service providers will independently communicate with each other using an unlicensed band.

Therefore, for example, in unlicensed bands, the adoption of transmission control based on a listen before talk (LBT) mechanism for minimizing interference with other systems has been conceived. In the LBT mechanism, a transmission device executes listening before the transmission of a signal and measures or detects a transmitted signal from another communication system (unlicensed band communication of another operator, Wi-Fi, or the like). The transmission device performs signal transmission in a case that a transmitted signal from another communication system that becomes interference is not detected. In a case that the transmission device detects a transmitted signal from another communication system that becomes interference, the transmission device stops signal transmission and executes listening again after the elapse of a certain period of time.

Here, a case in which signal transmission is performed in an unlicensed band from a terminal device to a base station device will be described. In this case, even in a case that the base station device assigns a resource block (frequency and time) for uplink data transmission to the terminal device, the terminal device may detect communication of another communication system through LBT, for example, immediately before the signal transmission. In this case, the terminal device stops signal transmission and waits for transmission until another resource block is re-assigned from the base station device. Thus, a large delay (fluctuation) can occur in a signal transmission timing of the terminal device.

In order to solve the above-described problem, in the Third Generation Partnership Project (3GPP), technology for assigning a plurality of resource blocks at a time in a case that a base station assigns resource blocks to a terminal has been proposed (Non-Patent Document 1). Thereby, it is expected that a time for which the terminal waits for a resource block to be re-assigned from the base station will be reduced.

Next, second background art will be described.

In a licensed-assisted access using LTE (LAA) scheme, a terminal device performs interference wave detection immediately before a signal is transmitted to a base station device using an unlicensed band. The LAA scheme is a scheme of performing wireless communication using an unlicensed band in a Long Term Evolution (LTE) scheme. LAA is also referred to as LTE in unlicensed spectrum (LTE-U). The unlicensed band is a frequency band for which licensing is not required. Thus, there is a possibility that service providers who are not necessarily licensed will communicate with each other using an unlicensed band without coordinating with each other.

In the LAA scheme, even in a case that the base station device assigns a resource block for use in signal transmission by the terminal device, the terminal device waits for another resource block to be assigned to the terminal device without transmitting a signal in a case that the terminal device detects communication based on a scheme other than the LAA scheme, for example, communication of a wireless local area network (LAN) defined in IEEE 802.11. Thus, a large delay may occur in a transmission timing of a signal from the terminal device or fluctuation may occur.

In Non-Patent Document 1, a base station device that assigns a plurality of resource blocks at a time in a case that resource blocks are assigned to a terminal device that performs communication in the LAA scheme is disclosed. It is possible to perform transmission using another resource block without waiting for the next resource block to be assigned even in a case that the terminal device is not able to perform transmission using any resource block. As a result, a delay in a transmission timing of a signal from the terminal device and occurrence of fluctuation are minimized.

PRIOR ART DOCUMENT

Patent Document

[Non-Patent Document 1] LG Electronics et al., WF on multi-subframe scheduling in LAA, R1-161409, 3GPP, Feb. 15, 2016

SUMMARY OF THE INVENTION

Problem to Be Solved by the Invention

However, the above-described first background art has the following first problem. That is, according to the technology described in Non-Patent Document 1, a resource block that is not selected by the terminal device among a plurality of assigned resource blocks is not used. Therefore, it is preferable to improve utilization efficiency of radio resources while reducing a signal delay in a communication system.

Also, the above-described second background art has the following second problem. That is, according to the LAA scheme, the base station device may assign more resource blocks than resource blocks actually required by the terminal. Thus, some of the assigned resource blocks may remain unused.

A first aspect of the present invention has been made in view of the above-described first problem, and an objective of the first aspect of the present invention is to provide a communication system, a base station device, a terminal device, and a communication method capable of improving utilization efficiency of radio resources while reducing a signal delay.

A second aspect of the present invention has been made in view of the above-described second problem, and an objective of the second aspect of the present invention is to provide a communication system, a base station device, a terminal device, a communication method, and a program capable of effectively using a resource block assigned to a terminal device.

Means for Solving the Problems

A first aspect of the present invention is a communication system for improving utilization efficiency of radio resources. The communication system includes a base station device and a plurality of terminal devices that communicate with the base station device. The base station device comprises a scheduling control unit that assigns radio resources including at least one or more resource blocks to at least one of the plurality of terminal devices, and a reception processing unit that demodulates a reception signal from the terminal device. The terminal device comprises a transmission control unit that transmits transmission data by using at least some of the radio resources assigned to the at least one of the plurality of terminal devices.

A second aspect of the present invention is made to solve the above-described problem, one aspect of the present invention is a base station device including a communication unit configured to communicate with a plurality of terminal devices and a control unit, wherein the control unit assigns resource blocks to a first terminal device that is any one of the plurality of terminal devices, identifies at least one of unused resource blocks that are unused by the first terminal device among the assigned resource blocks, and assigns at least one of the identified unused resource blocks to another terminal device different from the first terminal device.

Effect of the Invention

According to the first aspect of the present invention, it is possible to improve utilization efficiency of radio resources while reducing a signal delay.

Also, according to the second aspect of the present invention, it is possible to effectively use a resource block assigned to a terminal device.

BRIEF DESCRIPTION OF THE DRAWINGS

FIG. 23 is a flowchart illustrating an example of a scheduling process of a small cell base station according to the fourth embodiment.

EMBODIMENTS FOR CARRYING OUT THE INVENTION

First Embodiment

Hereinafter, a first embodiment of the present invention will be described with reference to the drawings.
<Outline of Communication System>

Figure 1:
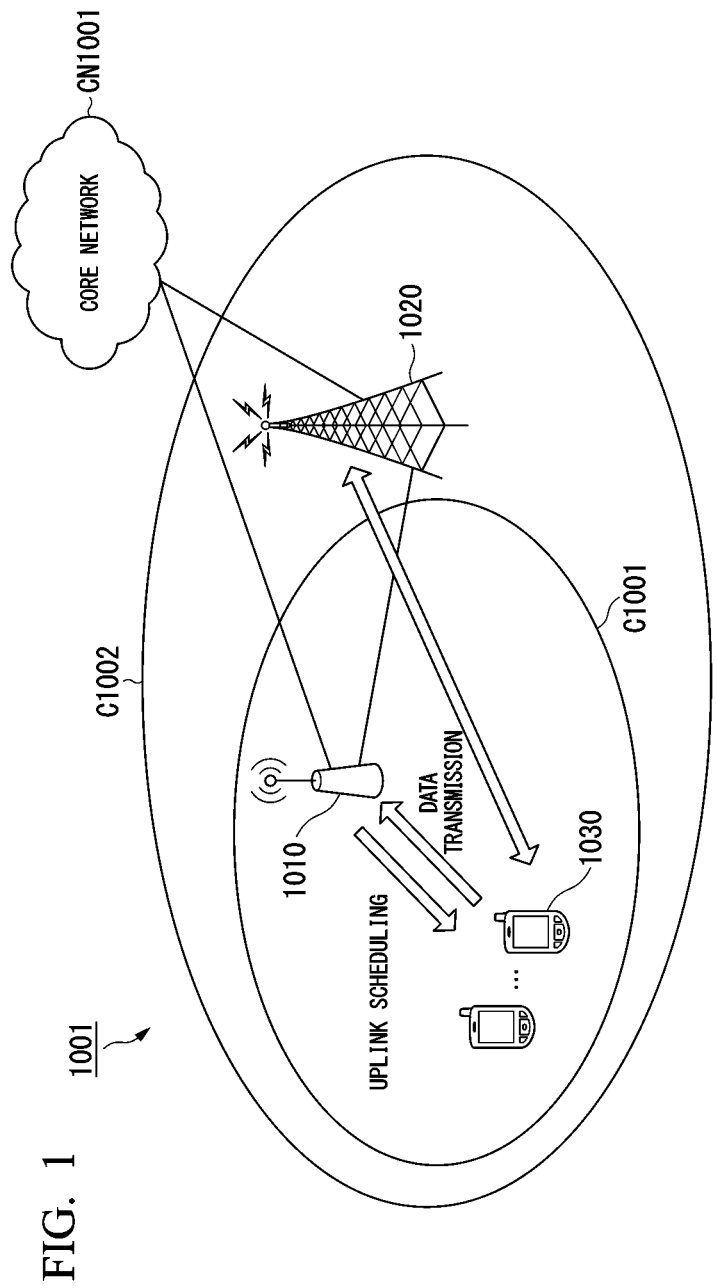
FIG. 1 is a schematic diagram illustrating a configuration of a communication system according to a first embodiment of the present invention.

FIG. 1 is a schematic diagram illustrating a configuration of a communication system 1001 according to the present embodiment. The communication system 1001 is a communication system that performs wireless communication using a predetermined communication scheme, for example, a licensed assisted access (LAA) scheme. The LAA scheme is a wireless communication scheme proposed in 3GPP and is a wireless communication scheme of performing carrier aggregation (CA) of a licensed band in a primary cell (Pcell) and an unlicensed band in a secondary cell (Scell).

Also, the carrier aggregation is a technique of extending a bandwidth by bundling a plurality of frequency bands called component carriers (CCs). In the carrier aggregation, the primary cell is a name of a cell or a component carrier obtained by initially extending an RRC connection and the secondary cell is a name of a second or subsequent cell or component carrier.

The communication system 1001 is configured to include a small cell base station device 1010, a macrocell base station device 1020, a core network CN1001, and a plurality of terminal devices 1030. Although one small cell base station device 1010 and one macrocell base station device 1020 are illustrated in FIG. 1, a plurality of small cell base station devices 1010 and a plurality of macrocell base station devices 1020 may exist.

The small cell base station device 1010 transmits and receives various types of data by using an unlicensed band in a secondary cell. The small cell base station device 1010 schedules the transmission of uplink data to be transmitted by the terminal device 1030 and determines transmission parameters thereof. In general, a small cell base station device is a base station device having an arrival range of radio waves used for data transmission relatively narrower than that of the macrocell base station device. A small cell may indicate a small cell base station device as well as the range thereof. The small cell includes a microcell, a nanocell, a picocell, and a femtocell and a radius of the small cell is typically several tens to hundreds of meters or less.

The small cell base station device may be used to complement a function of the macrocell base station device. For example, the small cell base station device is installed in a region where a communication capacity is higher such as a region with a high population density or in a region where the arrival of radio waves from the macrocell is difficult. In the region where the arrival of radio waves is difficult, for example, a mountain, a shadow of a building, an underground space, or the like exists. In FIG. 1, a cell C1001 indicates a range which radio waves from the small cell base station device 1010 reach.

The macrocell base station device 1020 transmits and receives various types of data using a licensed band in a primary cell. The licensed band represents a frequency band required to be licensed. In general, a macrocell base station device is a base station device having an arrival range of radio waves used for data transmission relatively wider than that of the small cell base station device. A macrocell may indicate a macrocell base station device as well as the range thereof. A radius of the range of the macrocell is typically several hundreds of meters to several kilometers.

In FIG. 1, a cell C1002 has a range which radio waves from the macrocell base station device 1020 reach.

The small cell base station device 1010 and the macrocell base station device 1020 are connected to the core network CN1001 via an S1 interface, respectively. Also, the small cell base station device 1010 and the macrocell base station device 1020 are connected to each other, and, for example, may be directly connected via a high-speed/small-delay ideal dedicated circuit (ideal backhaul) or connected via an X2 interface. In the connection via the X2 interface, a relatively low-speed/medium-delay non-ideal backhaul may be used. These dedicated circuits may be a wireless or wired line.

Also, the small cell base station device 1010 and the macrocell base station device 1020 may be integrated as a single base station device.

The terminal device 1030 is a communication device that performs wireless communication with a communication partner device via the communication system 1001. The terminal device 1030 is, for example, a user device such as a portable phone device, a tablet terminal device, or a wireless communication card. The terminal device 1030 transmits uplink data to the small cell base station device 1010 based on transmission parameters received from the small cell base station device 1010.

In the communication system 1001, the small cell base station device 1010 or the macrocell base station device 1020 assigns radio resources including at least one or more resource blocks to a plurality of terminal devices 1030. The terminal device 1030 generates uplink transmission data by using at least some of radio resources assigned to the terminal device 1030 and transmits the generated uplink transmission data to the small cell base station device 1010. The small cell base station device 1010 demodulates a received signal from the terminal device 1030.

Also, the small cell base station device 1010 and the macrocell base station device 1020 may be integrated as a single base station device.

<Small Cell Base Station Device>

Next, a configuration of the small cell base station device 1010 according to the present embodiment will be described.

Figure 2:
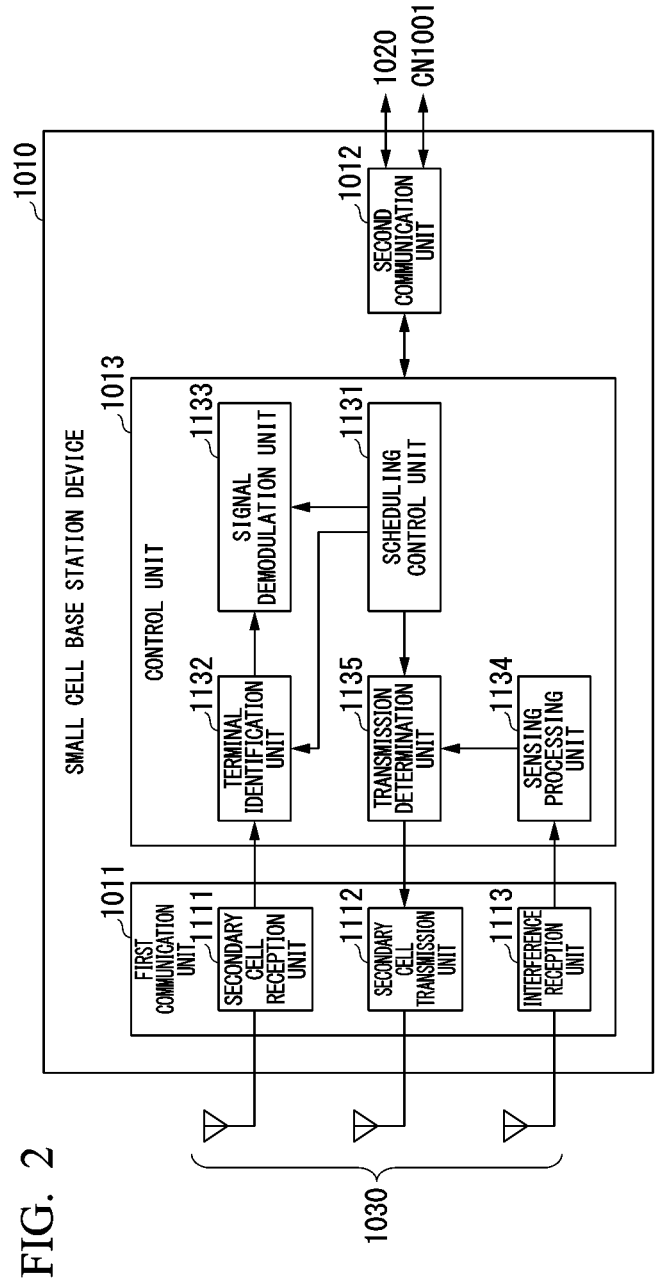
FIG. 2 is a schematic block diagram illustrating a configuration of a small cell base station device according to the first embodiment of the present invention.

FIG. 2 is a schematic block diagram illustrating a configuration of the small cell base station device 1010 according to the present embodiment. The small cell base station device 1010 is configured to include a first communication unit 1011, a second communication unit 1012, and a control unit 1013.

The first communication unit 1011 is configured to include a secondary cell reception unit 1111, a secondary cell transmission unit 1112, and an interference reception unit 1113.

The secondary cell reception unit 1111 receives radio waves of the unlicensed band as a received signal from the terminal device 1030. The secondary cell reception unit 1111 outputs the received signal to the control unit 1013.

The secondary cell transmission unit 1112 transmits a transmission signal input from the control unit 1013 as radio waves of an unlicensed band to the terminal device 1030.

The interference reception unit 1113 receives radio waves from another signal source as a received signal in a part or all of the unlicensed band. The received signal received by the interference reception unit 1113 may be referred to as an interference signal. The other signal source is typically a component device of a wireless communication system separate from the communication system 1001. As the separate wireless communication system, there are another wireless communication system using the LAA scheme, a wireless communication system using a communication scheme defined in IEEE 802.11, and the like. The interference reception unit 1113 outputs the received signal to a sensing processing unit 1134.

Also, the secondary cell reception unit 1111, the secondary cell transmission unit 1112, and the interference reception unit 1113 may be integrated as a single transmission/reception module by sharing the functions.

The second communication unit 1012 transmits and receives various types of data to and from each component device of the core network CN1001 and the macrocell base station device 1020.

The control unit 1013 is configured to include a scheduling control unit 1131, a terminal identification unit 1132, a signal demodulation unit 1133, a sensing processing unit 1134, and a transmission determination unit 1135.

The scheduling control unit 1131 determines uplink data transmission parameters and generates uplink scheduling information (a UL grant). The uplink data is transmitted using an uplink common channel (a physical uplink shared channel (PUSCH)) or the like. The uplink scheduling information includes, for example, radio resource information such as a resource block or a resource block group to be assigned, transmission parameters such as a transmission rate (a modulation and coding scheme (MCS)) and a transmission power control (TPC) command, and the like. A notification of the generated uplink scheduling information is provided to the terminal device 1030 through a downlink control channel (a physical downlink control channel (PDCCH) or the like). Although details of the notification will be described below, the terminal device may be individually notified or the notification may be provided as a common signal of a terminal device group including a plurality of terminal devices.

Also, in the present embodiment, the radio resource may indicate a resource block group including one or more resource blocks.

The scheduling control unit 1131 outputs the generated uplink scheduling information to the terminal identification unit 1132, the signal demodulation unit 1133, and the transmission determination unit 1135. Also, the scheduling control unit 1131 is described as a function within the small cell base station device 1010, but may be implemented as a function within the macrocell base station device 1020.

Based on the received signal input from the secondary cell reception unit 1111 and the uplink scheduling information input from the scheduling control unit 1131, the terminal identification unit 1132 identifies transmission source terminal devices 1030 and the number thereof included in the received signal. Although a specific method will be described below, identification is performed using a terminal-specific reference signal received from the terminal device 1030.

The terminal identification unit 1132 outputs the received signal to the signal demodulation unit 1133. Also, the terminal identification unit 1132 outputs identification information of terminal devices 1030 that are identified transmission sources and the number thereof to the signal demodulation unit 1133.

The signal demodulation unit 1133 separates and demodulates the received signal for each terminal device 1030 identified by the terminal identification unit 1132 based on transmission parameters scheduled by the scheduling control unit 1131. In a case that signals from a plurality of terminal devices 1030 have been transmitted in one resource block, the signals are demodulated after interference is removed using terminal-specific reference signals (details thereof will be described below).

The sensing processing unit 1134 receives a received signal from another system via the interference reception unit 1113 of the first communication unit 1011 during an LBT period. The LBT period is a predetermined period defined for confirming whether or not there is another communication system during communication immediately before data transmission starts (a busy or idle state). The predetermined period may differ according to quality of service (QoS)), the number of busy state determinations, or the like.

The sensing processing unit 1134 measures reception power of the received signal and outputs the measured reception power to the transmission determination unit 1135.

The transmission determination unit 1135 determines whether or not to transmit uplink scheduling information input from the scheduling control unit 1131 to the terminal device 1030 based on the reception power input from the sensing processing unit 1134. For example, the transmission determination unit 1135 determines to transmit the uplink scheduling information in a case that the input reception power is less than a predetermined reception power threshold value and determines not to transmit the uplink scheduling information in a case that the input reception power is greater than the predetermined reception power threshold value. In a case that it is determined that the uplink scheduling information is transmitted, the transmission determination unit 1135 outputs the uplink scheduling information to the secondary cell transmission unit 1112. Thereafter, the uplink scheduling information is transmitted as a transmission signal from the secondary cell transmission unit 1112.

In addition, the control unit 1013 performs various control related to the communication of the small cell base station device 1010. Such control includes, for example, various types of processes on received data and transmission data, control of a carrier frequency to be used for transmission and reception in the first communication unit 1011, registration of a location of the terminal device 1030, a connection with the terminal device 1030, a handover, and the like.

<Terminal Device>

Next, a configuration of the terminal device 1030 according to the present embodiment will be described.

Figure 3:
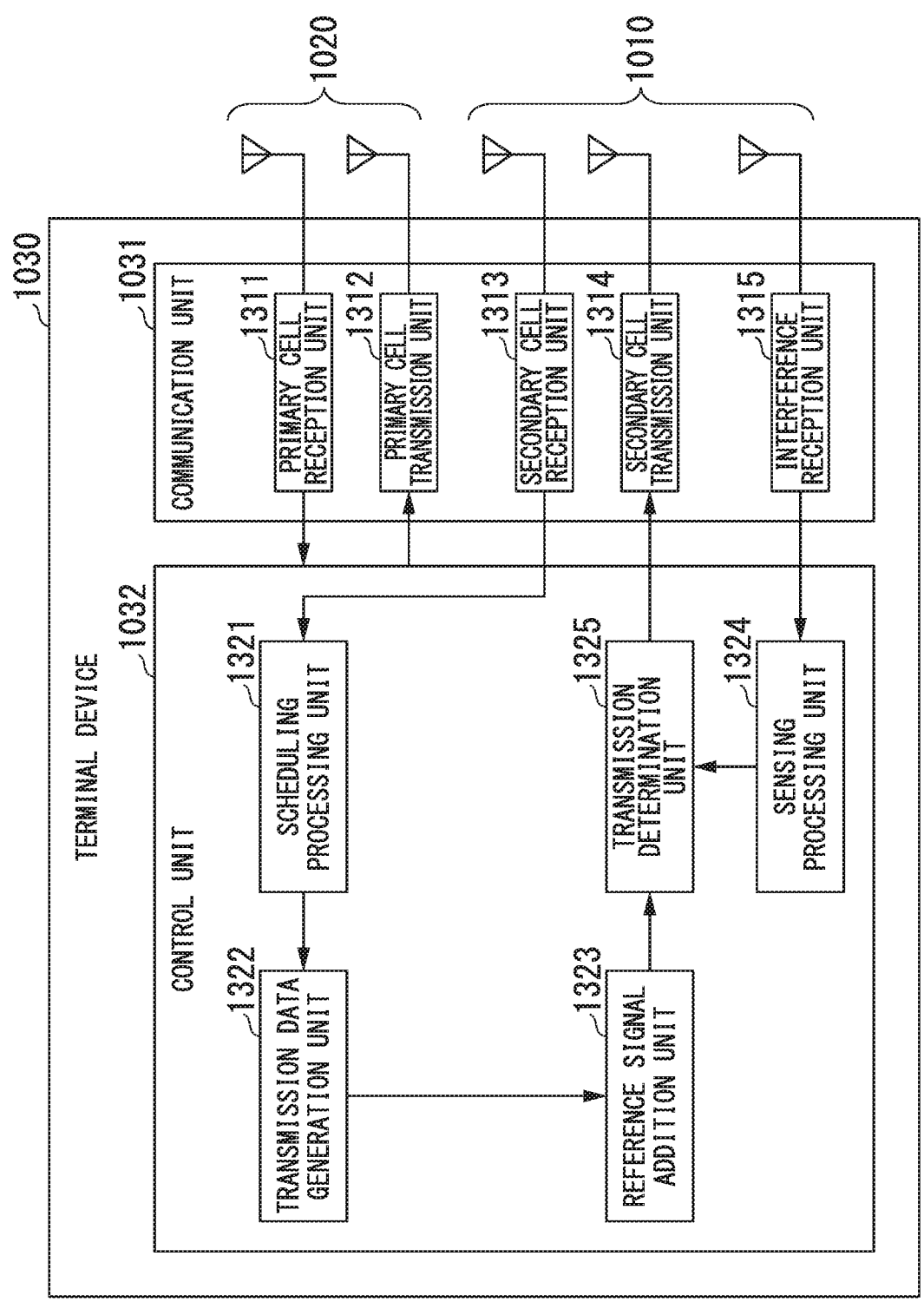
FIG. 3 is a schematic block diagram illustrating a configuration of a terminal device according to the first embodiment of the present invention.

FIG. 3 is a schematic block diagram illustrating the configuration of the terminal device 1030 according to the present embodiment. The terminal device 1030 is configured to include a communication unit 1031 and a control unit 1032.

The communication unit 1031 is configured to include a primary cell reception unit 1311, a primary cell transmission unit 1312, a secondary cell reception unit 1313, a secondary cell transmission unit 1314, and an interference reception unit 1315.

The primary cell reception unit 1311 receives radio waves of a licensed band transmitted from the macrocell base station device 1020 as a received signal. The primary cell reception unit 1311 outputs the received signal to the control unit 1032.

The primary cell transmission unit 1312 transmits a transmission signal input from the control unit 1032 to the macrocell base station device 1020 as radio waves of a licensed band.

The secondary cell reception unit 1313 receives radio waves of an unlicensed band from the small cell base station device 1010 as a received signal. The secondary cell reception unit 1313 outputs the received signal to the scheduling processing unit 1321.

The secondary cell transmission unit 1314 transmits a transmission signal input from the transmission determination unit 1325 as radio waves of the unlicensed band to the small cell base station device 1010.

The interference reception unit 1315 receives radio waves of a part or all of the unlicensed band as a received signal from another signal source. The interference reception unit 1315 outputs the received signal to the sensing processing unit 1324.

Also, in the example illustrated in FIG. 3, the primary cell reception unit 1311, the primary cell transmission unit 1312, the secondary cell reception unit 1313, the secondary cell transmission unit 1314, and the interference reception unit 1315 are illustrated as separate components but some or all of the components may be common.

The control unit 1032 is configured to include a scheduling processing unit 1321, a transmission data generation unit 1322, a reference signal addition unit 1323, a sensing processing unit 1324, and a transmission determination unit 1325.

The scheduling processing unit 1321 demodulates the received signal input from the secondary cell reception unit

1313 and acquires the uplink scheduling information transmitted as a downlink control signal. The scheduling processing unit 1321 extracts transmission parameters of uplink data from the acquired uplink scheduling information. The transmission parameters include the above-described resource block, transmission rate, TPC command, and the like. The scheduling processing unit 1321 outputs the extracted transmission parameters of the uplink data to the transmission data generation unit 1322.

Also, in the case of cross-scheduling to be described below, the scheduling processing unit 1321 acquires the uplink scheduling information from the received signal input from the primary cell reception unit 1311.

The transmission data generation unit 1322 generates uplink transmission data based on the transmission parameters of the uplink data input from the scheduling processing unit 1321. The transmission data generation unit 1322 outputs the generated uplink transmission data to the reference signal addition unit 1323.

The reference signal addition unit 1323 adds a terminal-specific reference signal assigned from the small cell base station device 1010, the macrocell base station device 1020, or the core network CN1001 to the uplink transmission data input from the transmission data generation unit 1322. The terminal-specific reference signal is assigned so that the terminal devices 1030 to which the same radio resource is assigned are orthogonal to each other (do not interfere with each other) and is used in a case that received data is demodulated in the small cell base station device 1010. The reference signal addition unit 1323 outputs the uplink transmission data to which the reference signal is added to the transmission determination unit 1325.

Also, the terminal-specific reference signal may be generated by the terminal device 1030 based on parameters received from the small cell base station device 1010, the macrocell base station device 1020, or the core network CN1001.

The sensing processing unit 1324 receives a received signal of another system via the interference reception unit 1315 of the communication unit 1031 during the LBT period. The sensing processing unit 1324 measures reception power of the received signal and outputs the measured reception power to the transmission determination unit 1325.

The transmission determination unit 1325 determines whether or not to transmit uplink data at a predetermined transmission time based on the reception power input from the sensing processing unit 1324. The predetermined transmission time is, for example, after four subframes from a subframe in which downlink data is received. The uplink data is uplink transmission data input from the reference signal addition unit 1323 and is data to which a reference signal is added. For example, the transmission determination unit 1325 determines to transmit the uplink data in a case that the input reception power is less than a predetermined reception power threshold value and determines not to transmit the uplink data in a case that the input reception power is greater than the predetermined reception power threshold value. In a case that it is determined that the uplink data is transmitted, the transmission determination unit 1325 outputs the uplink data to the secondary cell transmission unit 1314. The uplink data is transmitted using an uplink shared channel (a physical uplink shared channel (PUSCH)) via the secondary cell transmission unit 1314.

In addition, the control unit 1032 performs various control related to the communication of the terminal device 1030. Such control includes, for example, various types of processes on received data and transmission data, control of carrier frequencies for use in transmission and reception in the communication unit 1031, location registration via the small cell base station device 1010 or the macrocell base station device 1020, a connection with the small cell base station device 1010 or the macrocell base station device 1020, a handover, and the like.

<Scheduling Process>

Next, a scheduling process will be described.

There are self-scheduling and cross-scheduling in an uplink scheduling information notification method. The self-scheduling is a technique in which a base station device serving as a transmission destination of uplink data generates uplink scheduling information related to the data and notifies a terminal device of a transmission source of the uplink data of the generated scheduling information.

Figure 4:
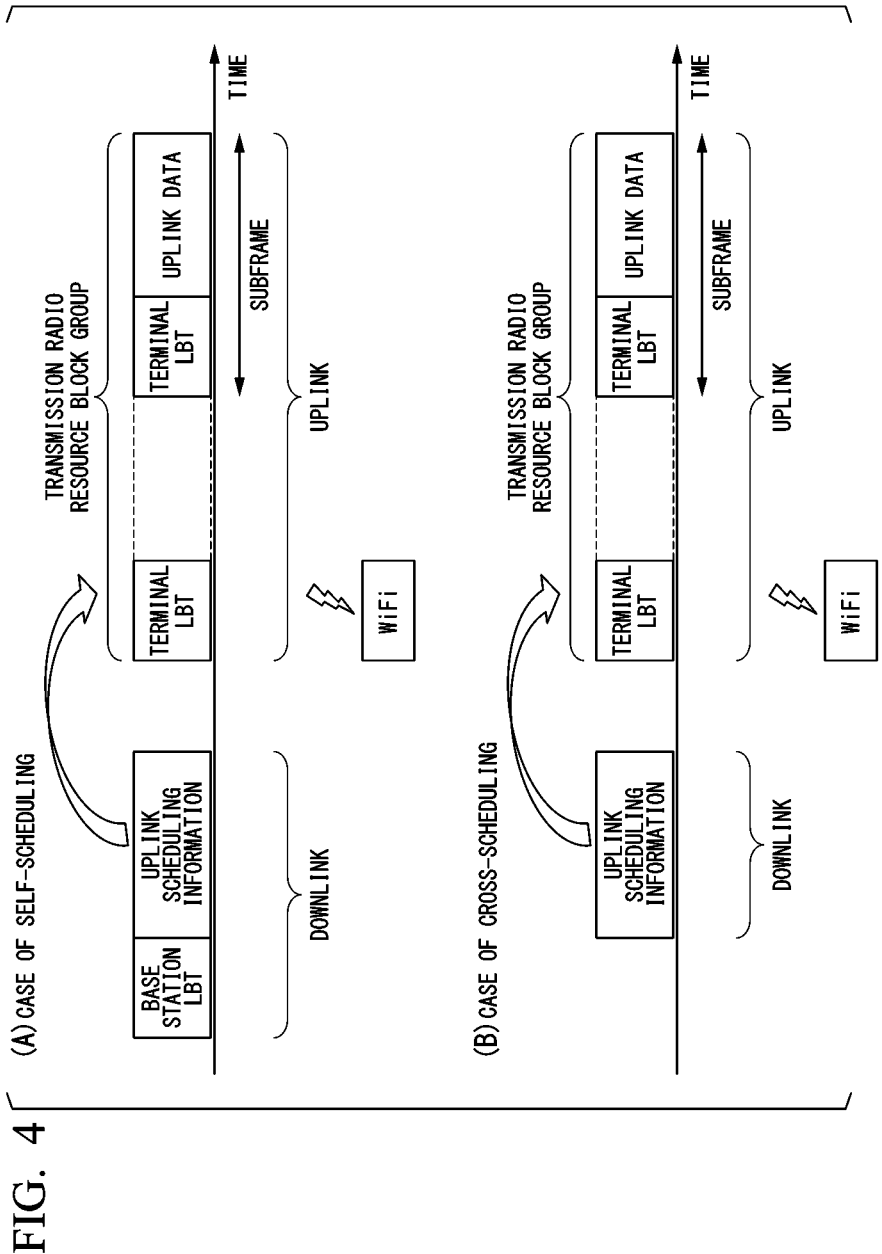
FIG. 4 is a timing chart illustrating a scheduling process according to the first embodiment of the present invention.

FIG. 4 is a timing chart illustrating the scheduling process according to the present embodiment. FIG. 4(A) illustrates the case of the self-scheduling. The transmission determination unit 1135 of the small cell base station device transmits the uplink scheduling information (Scell downlink/uplink scheduling information) generated by the scheduling control unit 1131 to the terminal device 1030. The sensing processing unit 1134 of the small cell base station device 1010 performs LBT immediately before the transmission of the uplink scheduling information. The sensing processing unit 1324 of the terminal device 1030 performs LBT immediately before the transmission of the uplink data. A time of the start of transmission of the uplink data is, for example, after four subframes from a time in point at which the scheduling processing unit 1321 has received the uplink scheduling information from the small cell base station device 1010.

The transmission determination unit 1325 of the terminal device 1030 determines the availability of transmission based on a result of LBT and transmits the uplink data to the small cell base station device 1010 by using at least some of scheduled radio resources in a case that it is determined that the transmission is performed. In FIG. 4(A), an example in which transmission is not possible because a result of LBT indicates that the state is determined to be a busy state in a first subframe of the scheduled radio resources and transmission is possible because a result of LBT indicates that the state is determined to be an idle state in the next subframe is illustrated.

The cross-scheduling is a technique in which a base station device different from the base station device to which the uplink data is transmitted generates uplink scheduling information related to the data and transmits the generated uplink scheduling information to a terminal device of a transmission source of the uplink data. That is, whether the base station device that generates and transmits the uplink scheduling information is the small cell base station device 1010 or the macrocell base station device 1020 differs according to the scheduling notification method.

FIG. 4(B) illustrates the case of the cross-scheduling. The macrocell base station device 1020 transmits the generated uplink scheduling information (Pcell downlink/uplink scheduling information) to the terminal device 1030. In this case, because the macrocell base station device 1020 uses a licensed band, LBT may be not performed. Based on the uplink scheduling information received from the macrocell base station device 1020, the terminal device 1030 performs a transmission process on uplink data as in the case of the self-scheduling. In FIG. 4(B), an example in which transmission is not possible because a result of LBT indicates that the state is determined to be a busy state in a first subframe of the scheduled radio resources and transmission is possible because a result of LBT indicates that the state is determined to be an idle state in the next subframe is illustrated. Also, in the case of the cross-scheduling, the configuration of the scheduling control unit 1131 may be omitted in the small cell base station device 1010.

<Terminal Groups>

Next, terminal groups will be described. The scheduling control unit 1131 of the small cell base station device 1010 assigns radio resources including at least one or more resource blocks to a plurality of terminal devices 1030. A set of terminal devices 1030 to which the same radio resource is assigned will be described as a terminal group in the following description.

Figure 5:
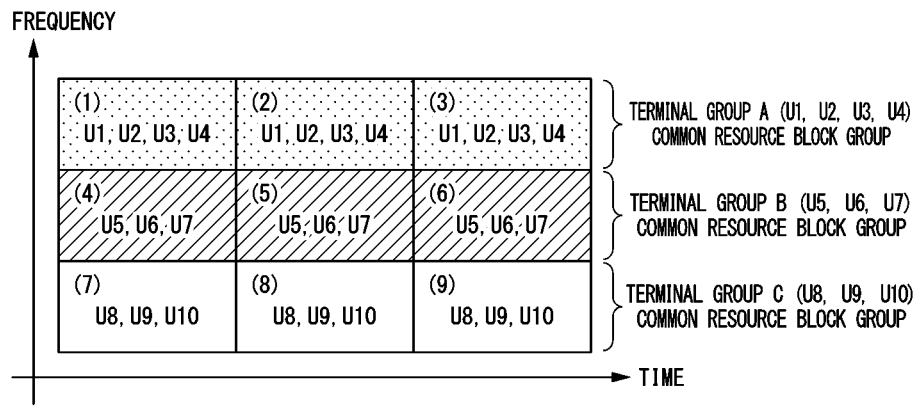
FIG. 5 is a schematic diagram illustrating an example of assignment of terminal groups according to the first embodiment of the present invention.

FIG. 5 is a schematic diagram illustrating an example of assignment of terminal groups in the present embodiment. In FIG. 5, a horizontal axis direction represents time, a vertical axis direction represents frequency, and a region surrounded by one frame line represents a resource block. In this example, ten terminal devices 1030 (U1, U2, . . . , U10) are divided into three terminal groups A, B, and C and radio resources are assigned to each terminal group. Specifically, a resource block group (a dot shaded part) including resource blocks (1), (2), and (3) in FIG. 5 is assigned to a terminal group A (U1, U2, U3, U4), a resource block group (a diagonally shaded part) including resource blocks (4), (5), and (6) in FIG. 5 is assigned to a terminal group B (U5, U6, U7), and a resource block group (a non-shaded part) including resource blocks (7), (8), and (9) in FIG. 5 is assigned to a terminal group C (U8, U9, U10).

Here, the scheduling control unit 1131 of the small cell base station device 1010 sets an upper limit for the number of terminal devices 1030 belonging to one terminal group. The upper limit number of devices is the number of devices for which the small cell base station device 1010 can restore signals by removing interference between received data from the terminal devices 1030 even in a case that the terminal devices 1030 belonging to the group simultaneously transmit signals. Thus, this does not indicate that data cannot be demodulated due to interference of uplink data received from the terminal device 1030 in the small cell base station device 1010.

The terminal device 1030 transmits uplink data by using at least a part of the resource block group assigned to a terminal group to which the terminal device 1030 belongs. For example, because the resource blocks (1), (2) and (3) are assigned to the terminal group A to which the terminal device 1030 belongs, the terminal device 1030 represented by U1 first attempts to transmit uplink data by using the temporally earliest resource block (1). The terminal device 1030 transmits uplink data in a case that it is determined that transmission is possible by making an LBT determination and attempts to transmit uplink data at the next timing (e.g., the resource block (2)) in a case that it is determined that transmission is not possible.

For example, even in a case that U1, U2, and U3 among the terminal devices 1030 (U1, U2, U3, U4) within the terminal group A cannot transmit data in the resource block (1) according to an LBT determination (a busy state), U4 can transmit data in a resource block (1) according to an LBT determination (an idle state). Further, even in a case that U1 and U2 cannot transmit data in a resource block (2) according to an LBT determination (a busy state), U3 can transmit data in a resource block (2) according to an LBT determination (an idle state). Then, U1 and U2 perform data transmission in a resource block (3) according to an LBT determination (an idle state). In this manner, because a resource block group including a plurality of resource blocks is assigned to a terminal group including a plurality of terminal devices 1030, it is not necessary to wait for resource block assignment and it is possible to reduce a probability of occurrence of unused resource blocks. That is, it is possible to effectively use radio resources while reducing a signal delay.

Also, although a resource block group including a plurality of resource blocks is assigned as radio resources to a plurality of terminal devices 1030 in the present embodiment, one resource block may be assigned to the plurality of terminal devices 1030.

Also, in a case that the terminal devices are grouped, it is preferable that terminal devices in environments as different as possible constitute the same group. For example, grouping of terminal devices existing in a cell center and a cell edge and between the cell center and the cell edge is conceivable. This can be determined according to quality information (RSSI/RSRQ/CQI or the like) received from the terminal device by the base station device. In other words, it is preferable to configure a terminal group including terminals of various quality information (communication quality). Also, for example, it is preferable to configure a terminal group including a stationary terminal device, a terminal device which moves at a medium speed, and a terminal device which moves at a high speed based on a movement state of the terminal device. Furthermore, it is preferable to preferentially group terminals having a high signal level ratio for a certain average time.

Whether or not a terminal device can use a specific resource block significantly depends on an environment of the terminal device. In this manner, it is possible to increase a probability that another terminal can transmit a signal in a certain resource block even in a case that a certain terminal cannot transmit a signal in the resource block by grouping terminals with environments as different as possible. That is, radio resources can be used more efficiently.

Also, the terminal group may be determined according to the purpose of communication of terminal devices, required quality, or the like. For example, the terminal devices may be divided into a group of terminals requiring high-speed communication and a group of terminal devices requiring a small delay. For example, resource blocks of the same time width are illustrated in FIG. 5, but a long time width can be set for a group of high-speed communication and a short time width may be set for a small-delay group.

<Rearrangement of Terminal Groups>

Terminal groups can be rearranged. A rearrangement method will be described below.

As the rearrangement of the terminal groups, a scheme of appropriately rearranging terminal groups set at the start of communication during communication may be adopted. In this case, it is necessary to provide a terminal group notification to the terminal device again every time a terminal group is rearranged, but it is possible to perform flexible scheduling according to a situation of radio resources, an environment, or the like.

Also, a scheme of rearranging a terminal group set at the start of communication for each resource block may be adopted. For example, in a case that a resource block (1) is assigned to a terminal group A, there is a rearrangement for assigning the resource block (1) to a terminal group B or the like. Thereby, it is possible to increase a probability that terminal devices in different environments will belong to the same group.

Also, a scheme in which the terminal group set at the start of communication is not changed until the communication is completed may be adopted. In this case, the number of terminals within the terminal group increases/decreases according to timings of a communication start and a communication end of each of the terminal devices 1030.

In this scheme, because the terminal group set at the start of communication is maintained until the communication end, there is an advantage that a terminal group notification process can be completed at only one time at the start of communication.

<Communication Process>

Next, a communication process to be performed by the communication system 1001 according to the present embodiment will be described.

Figure 6:
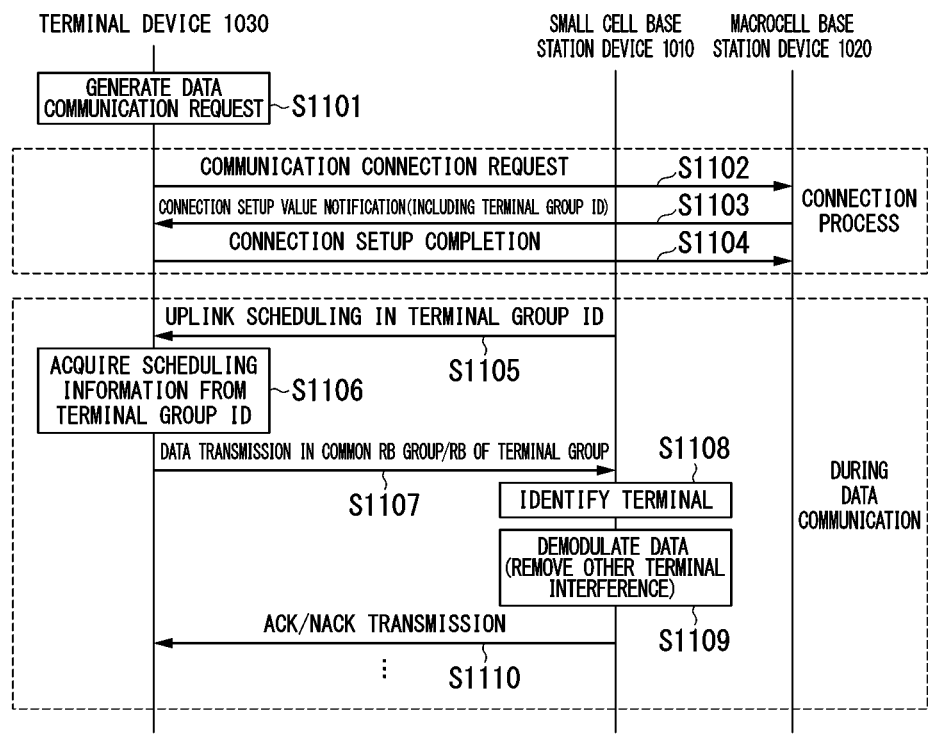
FIG. 6 is a sequence diagram illustrating an example of a communication process according to the first embodiment of the present invention.

FIG. 6 is a sequence diagram illustrating an example of the communication process according to the present embodiment.

(Step S1101) In the terminal device 1030, for example, in a case that there is a request from an application within the terminal or the like, the control unit 1032 of the terminal device 1030 recognizes the occurrence of the data communication request and proceeds to the processing of the step S1102.

(Step S1102) The control unit 1032 of the terminal device 1030 transmits a communication connection request to the macrocell base station device 1020 via the primary cell transmission unit 1312. Typically, the communication connection request is an RRC connection request in radio resource control (RRC). Thereafter, the process proceeds to the processing of step S1103.

(Step S1103) In a case that a communication connection request is received from the terminal device 1030, the macrocell base station device 1020 transmits connection setup values that are various types of setup values used in communication to the terminal device 1030. A connection setup value notification is typically RRC Connection Setup in RRC. A connection setup value includes an ID of a terminal group used in scheduling. Specifically, a notification of an ID of a terminal group to which the transmission destination terminal device 1030 belongs is provided. Thereafter, the process proceeds to the processing of step S1104.

(Step S1104) The control unit 1032 of the terminal device 1030 receives the connection setup value notification from the macrocell base station device 1020 via the primary cell reception unit 1311. In a case that various settings for starting the communication are completed, the control unit 1032 transmits a connection setup completion notification to the macrocell base station device 1020 via the primary cell transmission unit 1312. A connection setup completion notification is typically RRC Connection Setup Complete in RRC. Thereafter, the process proceeds to the processing of step 1105.

Steps S1102 to S1104 are a connection process at the start of communication, and thereafter the process moves to processing during data communication.

Also, although the terminal device 1030 performs the connection process with the macrocell base station device 1020 which is the primary cell in the present embodiment, the connection process may be performed with the small cell base station device 1010.

(Step S1105) The scheduling control unit 1131 of the small cell base station device 1010 generates scheduling information based on the terminal group ID and transmits the scheduling information to the terminal device 1030 via the secondary cell transmission unit 1112. A notification of the scheduling information is typically provided on a downlink control channel (PDCCH). Thereafter, the process proceeds to the processing of step S1106.

Figures 7, 8:
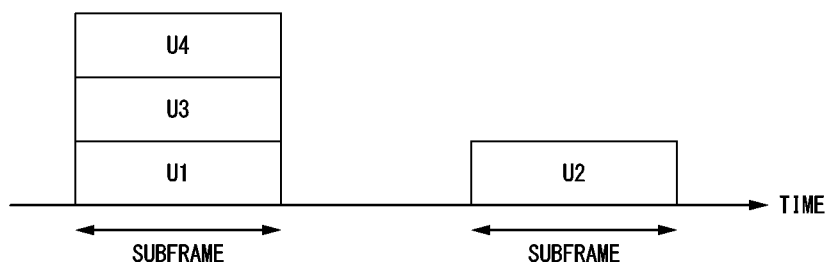
FIG. 7 is a schematic diagram illustrating an example of scheduling information according to the first embodiment of the present invention.
FIG. 8 is a timing chart illustrating an example of a received signal of the base station device according to the first embodiment of the present invention.

Here, an example of the scheduling information will be described. FIG. 7 is a schematic diagram illustrating an example of the scheduling information according to the present embodiment.

The scheduling information includes (a) an assigned radio resource corresponding to a terminal group ID. In this case, a control channel (e.g., PDCCH) in which scheduling information is stored is encoded according to a terminal group ID. Alternatively, the scheduling information may include (b) each terminal group ID and assigned radio resources corresponding to each terminal group ID. In this case, the control channel (e.g., PDCCH) in which the present scheduling information is stored is arranged in a certain fixed region or in a fixed search space. The assigned radio resource is information indicating a position and time of an assigned subcarrier. Specifically, a resource block group including one or more resource blocks is assigned.

The terminal group ID indicates an identifier (ID) of a terminal group that is an assignment target of the radio resource described in the assigned radio resource. Alternatively, a code for demodulating a control channel (e.g., PDCCH) including scheduling information of a terminal group is shown. In the example of FIG. 7, the resource blocks (1), (2) and (3) are assigned to the terminal group A.

Also, although the self-scheduling in which the small cell base station device 1010 performs scheduling has been described in the present embodiment, the macrocell base station device 1020 may transmit the scheduling information in the case of the cross-scheduling.

(Step S1106) The scheduling processing unit 1321 of the terminal device 1030 searches for and acquires scheduling information corresponding to a terminal group ID received from the small cell base station device 1010 based on an ID of a terminal group to which the terminal device 1030 belongs indicated by a notification provided from the macrocell base station device 1020. In a case that the scheduling information is stored as shown in (a), for example, the scheduling information is acquired by searching for a control channel (e.g., PDCCH) including scheduling information assigned to a terminal group of the terminal device 1030 and demodulating the scheduling information by using the terminal group ID of the notification in step S1103. Alternatively, in a case that the scheduling information is stored as in (b), for example, the control channel existing in a certain fixed region or search space is demodulated and scheduling information corresponding to the terminal group ID provided through a notification in step S1103 is acquired. In the example of FIG. 7, the terminal device 1030 recognizes that the resource blocks assigned to the terminal group A are the resource blocks (1), (2) and (3). Thereafter, the process proceeds to the processing of step S1107.

(Step S1107) Based on the acquired scheduling information, the scheduling processing unit 1321 of the terminal device 1030 transmits an uplink signal to the small cell base station device 1010 by using at least some of common radio resources assigned to the terminal group to which the terminal device 1030 belongs.

The uplink signal is typically transmitted on an uplink common channel (PUSCH) via the secondary cell transmission unit 1314. Thereafter, the process proceeds to the processing of step S1108.

(Step S1108) In a case that the secondary cell reception unit 1111 of the small cell base station device 1010 receives an uplink signal from the terminal device 1030, the secondary cell reception unit 1111 inputs a received signal to the terminal identification unit 1132. The terminal identification unit 1132 identifies transmission source terminal devices 1030 based on the input received signal. Also, the terminal identification unit 1132 identifies the number of transmission source terminal devices 1030 included in the received signal. The terminal identification unit 1132 outputs the received signal and an identification result to the signal demodulation unit 1133. A specific process will be described below. Thereafter, the process proceeds to the processing of step S1109.

(Step S1109)

The signal demodulation unit 1133 of the small cell base station device 1010 performs a process of demodulating the received signal input from the terminal identification unit 1132. In a case that signals from a plurality of transmission source terminal devices are included in the resource block to be demodulated based on a result of identifying transmission source terminal devices and the number of transmission source terminal devices included in the received signal input from the terminal identification unit 1132, a demodulation process of each terminal device is performed by reducing interference from another terminal device. A specific demodulation process will be described below. Thereafter, the process proceeds to the processing of step S1110.

(Step S1110)

After the received signal is demodulated, the control unit 1013 of the small cell base station device 1010 notifies the terminal device 1030 of a reception (demodulation) result according to ACK/NACK. The control unit 1013 transmits ACK in a case that reception (demodulation) has succeeded and transmits NACK in a case that reception (demodulation) has failed. Thereafter, data transmission/reception is performed between the terminal device 1030 and the small cell base station device 1010 in a similar manner.

The above is an example of a communication process in the present embodiment. Also, various schemes can be applied to the terminal group ID notification.

For example, the macrocell base station device 1020 may notify the terminal device 1030 of a plurality of terminal group IDs or all terminal group IDs at the start of communication. Thereby, the terminal devices within the terminal group search for common scheduling information according to a terminal group ID and it is possible to improve the efficiency of radio resources of the control channel (e.g., PDCCH or the like).

Also, the macrocell base station device 1020 may notify the terminal device 1030 of all terminal group IDs to be used and a group switching cycle at the start of communication. For example, in the processing of step S1103, a notification of [A, B, C, 5 ms] is provided. Then, the terminal device 1030 performs switching of the terminal group ID with A, B, C, A, B, C, and the like every 5 ms.

Alternatively, the macrocell base station device 1020 may notify the terminal device 1030 of a difference between an initial terminal group ID and a group ID to be used subsequently, a switching cycle, and the like. For example, in a case that a notification of [A, +1, 5 ms] is provided, the terminal device 1030 performs switching of the terminal group ID to one next group with A, B, C, D, and the like every 5 ms. Thereby, in a case that the terminal group is rearranged, a terminal group ID notification can be completed at only one time.

Also, the macrocell base station device 1020 may notify the terminal device 1030 of the terminal group ID at the start of communication and provide a notification of a terminal group ID or difference information thereof in a case that ACK/NACK information for uplink data is transmitted at a subsequent group rearrangement time. Thereby, an appropriate rearrangement of terminal groups is possible and flexible scheduling according to an environment such as radio resource information is possible.

Also, the macrocell base station device 1020 may perform scheduling in the existing method without notifying the terminal device 1030 of the terminal group ID. That is, although the macrocell base station device 1020 assigns at least one or more radio resources to a plurality of terminal devices 1030, a notification to the terminal device 1030 is individually performed according to a terminal ID or the like instead of units of terminal groups. In this case, the terminal device 1030 can improve the efficiency of radio resources without being aware of the terminal group. Also, there is an effect that it is easy to deal with a detailed rearrangement of terminal groups.

Various methods are applicable for determining whether the terminal device 1030 searches for scheduling information based on a terminal group ID provided from a notification from the macrocell base station device 1020 or based on an existing terminal ID. For example, searching may be performed with a terminal group ID in a case that a notification of the terminal group ID and difference information thereof is provided or searching may be performed with a terminal ID in a case that no notification is provided. Alternatively, the small cell base station device 1010 or the macrocell base station device 1020 may separately issue an instruction related to an ID for which scheduling information is searched to the terminal device 1030.

Also, the macrocell base station device 1020 may notify the terminal device 1030 of a frequency hopping sequence specific to a terminal of a resource block among radio resources at the time of terminal group ID notification. Thereby, a frequency diversity effect or an interference randomization effect can be obtained.

<Received Signal of Base Station Device>

Next, an example of a received signal in the small cell base station device 1010 will be described.

FIG. 8 is a timing chart illustrating an example of a received signal in the small cell base station device 1010 according to the present embodiment. The horizontal axis represents a time direction, and U1, U2, U3 and U4 indicate signals transmitted from the terminal devices 30 (U1, U2, U3, U4) with corresponding numbers.

In this example, for a resource block group scheduled by the small cell base station device 1010, the signal transmission of the terminal devices U1, U3, and U4 succeeds in a first resource block. However, a result of the LBT determination indicates that the terminal device U2 cannot transmit a signal and cannot similarly perform transmission in a second resource block and indicates that the transmission has succeeded in a third resource block.

Also, in this example, although each terminal device transmits only one resource block with respect to the scheduled resource block group, data may be continuously transmitted within a scheduled resource block in a case that data to be further transmitted exists within a transmission buffer of the terminal. However, a transmission availability determination according to LBT is necessary.

<Demodulation Process of Base Station Device>

Next, a process of demodulating a received signal in the small cell base station device 1010 will be described.

Figure 9:
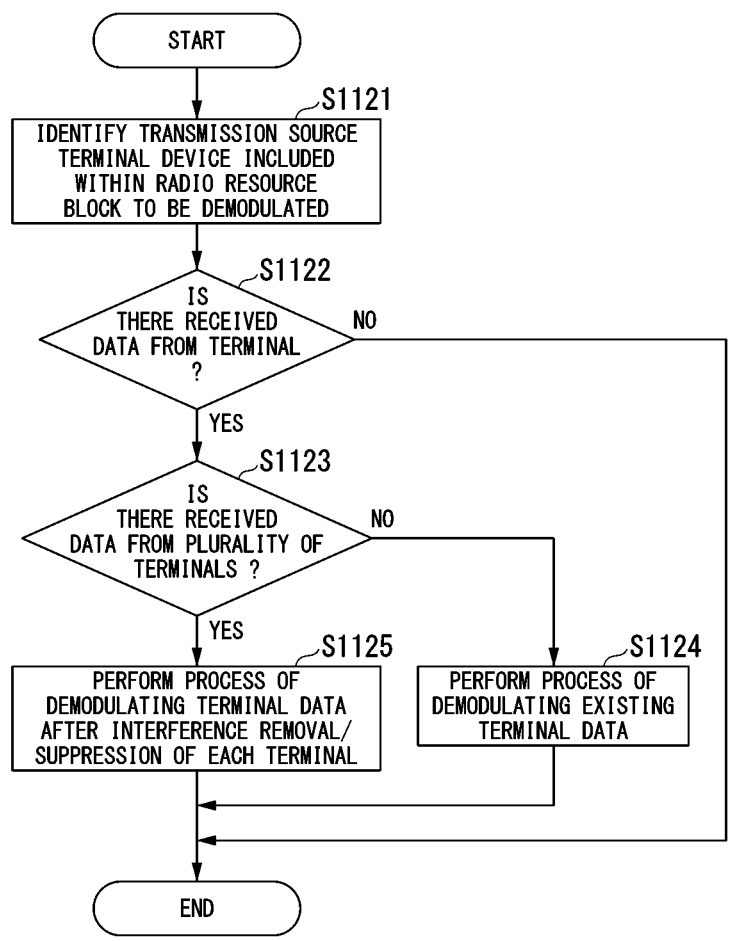
FIG. 9 is a flowchart illustrating a process of demodulating a received signal in the base station device according to the first embodiment of the present invention.

FIG. 9 is a flowchart illustrating a process of demodulating a received signal in the small cell base station device 1010 according to the present embodiment.

(Step S1121) In a case that a signal is received from the terminal device 1030 via the secondary cell reception unit 1111, the terminal identification unit 1132 of the small cell base station device 1010 identifies a transmission source terminal device of a signal included within a resource block to be demodulated. The identification of the transmission source terminal device is performed based on a reference signal specific to the terminal device 1030 received from the terminal device 1030. Because reference signals specific to the terminal devices 1030 are assigned so that they are orthogonal to each other within the same terminal group, the transmission source can be identified. Thereafter, the process proceeds to the processing of step S1122.

(Step S1122) The terminal identification unit 1132 of the small cell base station device 1010 determines whether or not there is a received signal from the terminal device 1030 within the resource block to be demodulated based on information of the transmission source terminal device identified in step S1121. In a case that the received signal from the terminal device 1030 is not included within the resource block to be demodulated (step S1122/NO), the process is terminated. In a case that there is a received signal from the terminal device 1030 within the resource block to be demodulated (step S1122/YES), the process proceeds to the processing of step S1123.

(Step S1123) The terminal identification unit 1132 of the small cell base station device 1010 determines whether or not signals from a plurality of terminal devices 1030 are included within a resource block to be demodulated based on the information of the transmission source terminal device identified in step S1121. In a case that the signals from the plurality of terminal devices 1030 are included within the resource block to be demodulated (step S1123/YES), the process proceeds to the processing of step S1125. In a case that the signals of the plurality of terminal devices 30 are not included within the resource block to be demodulated (step S1123/NO), the process proceeds to the processing of step S1124.

(Step S1124) In a case that a signal from one terminal device 1030 is included within the resource block to be demodulated, the signal demodulation unit 1133 of the small cell base station device 1010 determines that there is no interference with another terminal device 1030 within the resource block and performs a demodulation process of demodulating a received signal. The demodulation process is performed based on a result of channel estimation according to the reference signal specific to the terminal device 1030 received from the terminal device 1030. Specifically, a carrier wave criterion phase is compared with a phase of a received signal according to the reference signal specific to the terminal device 1030 and the transmission data of the terminal device 1030 is separated from the received signal and the separated transmission data is demodulated. Thereafter, the process is terminated.

(Step S1125) In a case that there are signals from a plurality of terminal devices 1030 within the resource block to be demodulated, the signals from the terminal devices 1030 interfere with each other, so that the signal demodulation unit 1133 of the small cell base station device 1010 performs a process of reducing interference between the terminal devices 1030. Reducing interference includes removing or suppressing interference. There are various techniques for a process of reducing interference, but the reduction of interference is performed by, for example, a replica generation type interference canceller. This is a technique of canceling the interference by generating a replica of an interference signal included in a received signal and subtracting the generated replica from the received signal. Also, the cancellation may be performed by, for example, turbo equalization. This is a technique of incorporating an equalizer for suppressing interference and a decoder for error correction as a processing module into the configuration of a turbo loop.

Also, in terms of the number of terminal devices 1030 belonging to one terminal group, the number of devices of which signals can be restored by reducing the interference between terminals in the processing of step S1125 is set as an upper limit. The upper-limit number of devices differs depending on the interference reduction process to be adopted. In this manner, because the number of terminal devices 1030 belonging to one terminal group is limited, signal demodulation is not impossible due to an increase in the number of multiplexes. Also, in a case that signals from the terminal device 1030 are multiplexed, an amount of calculation at the time of signal demodulation in the small cell base station device 1010 is reduced.

Also, there is also an effect that it is possible to reduce the number of orthogonal reference signals used in the entire communication system 1001 by grouping the terminals.

After the interference is reduced, the signal demodulation unit 1133 demodulates a received signal based on a reference signal specific to the terminal device 1030 received from the terminal device 1030 as in the processing of step S1124. Thereafter, the process is completed.

Second Embodiment

Next, a second embodiment of the present invention will be described. Components that are the same as those of the first embodiment are denoted by the same reference signs and the above description thereof is applied. Hereinafter, differences from the first embodiment will be mainly described.

<Outline of Communication System>

Figure 10:
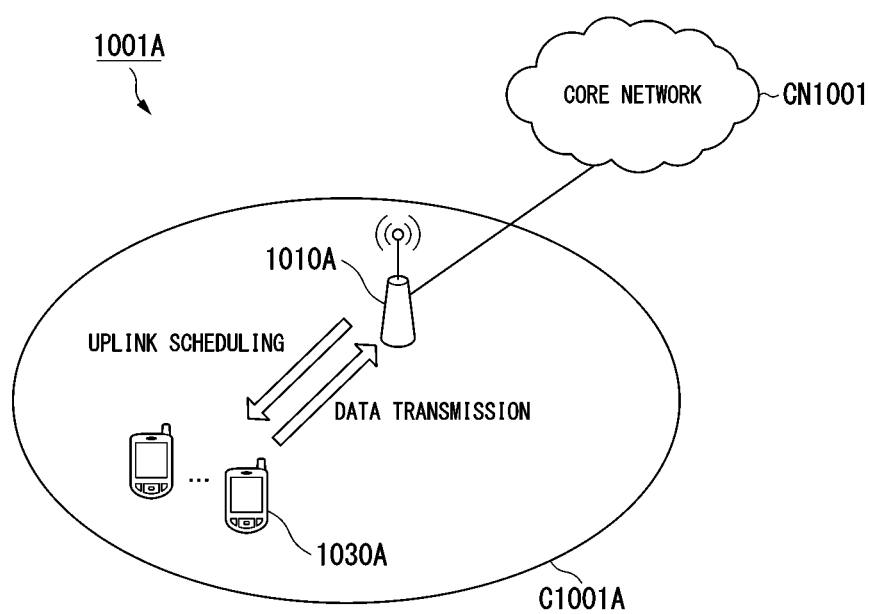
FIG. 10 is a schematic diagram illustrating a configuration of a communication system according to a second embodiment of the present invention.

FIG. 10 is a schematic diagram illustrating a configuration of the communication system 1001A according to the present embodiment. The communication system 1001A is configured to include a small cell base station device 1010A, a core network CN1001, and a terminal device 1030A.

The small cell base station device 1010A transmits and receives various data to and from the terminal device 1030A and the core network CN1001 by using a licensed band. C1001A denotes a range which radio waves of the small cell base station device 1010A reach.

<Small Cell Base Station Device>

Figure 11:
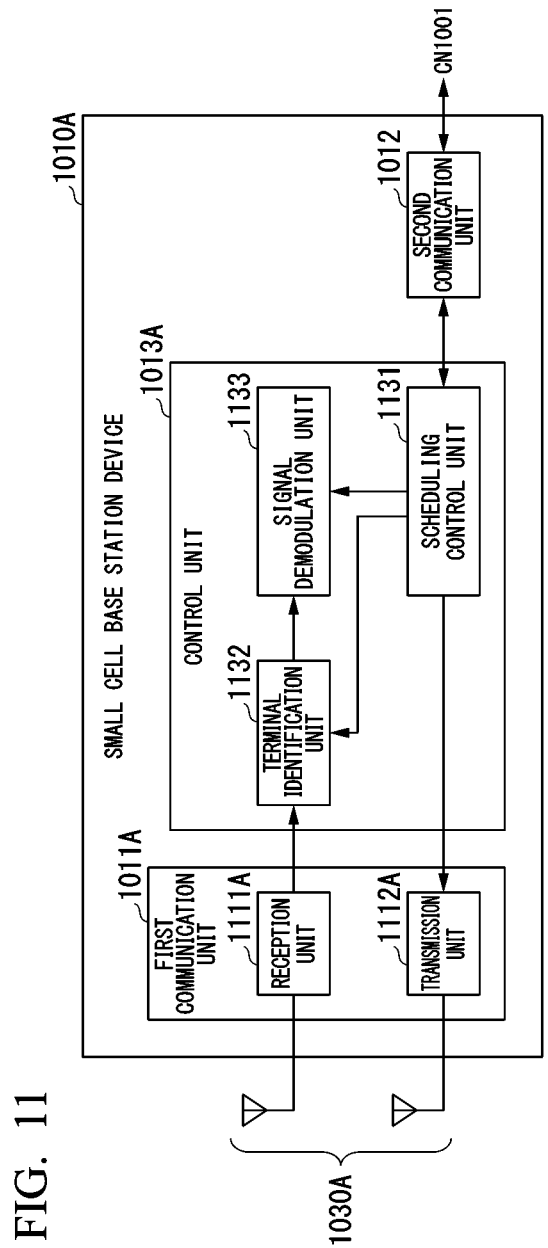
FIG. 11 is a schematic block diagram illustrating a configuration of a small cell base station device according to the second embodiment of the present invention.

FIG. 11 is a schematic block diagram illustrating a configuration of a small cell base station device 1010A according to the present embodiment. The small cell base station device 1010A is configured to include a first communication unit 1011A, a second communication unit 1012, and a control unit 1013A.

The first communication unit 1011A is configured to include a reception unit 1111A and a transmission unit 1112A.

The reception unit 1111A receives radio waves of a licensed band from the terminal device 1030A as a received signal. The reception unit 1111A outputs the received signal to the terminal identification unit 1132 of the control unit 1013A.

The transmission unit 1112A transmits a transmission signal input from the scheduling control unit 1131 of the control unit 1013A as the radio waves of the licensed band to the terminal device 1030A.

The first communication unit 1011A is different from the first communication unit 1011 according to the first embodiment in that the interference reception unit 1113 related to execution of an LBT determination is not included because the licensed band is used.

The control unit 1013A is configured to include a scheduling control unit 1131, a terminal identification unit 1132, and a signal demodulation unit 1133. The control unit 1013A is different from the control unit 1013 according to the first embodiment in that the sensing processing unit 1134 and the transmission determination unit 1135 related to execution of the LBT determination are not included because the licensed band is used.

<Terminal Device>

Figure 12:
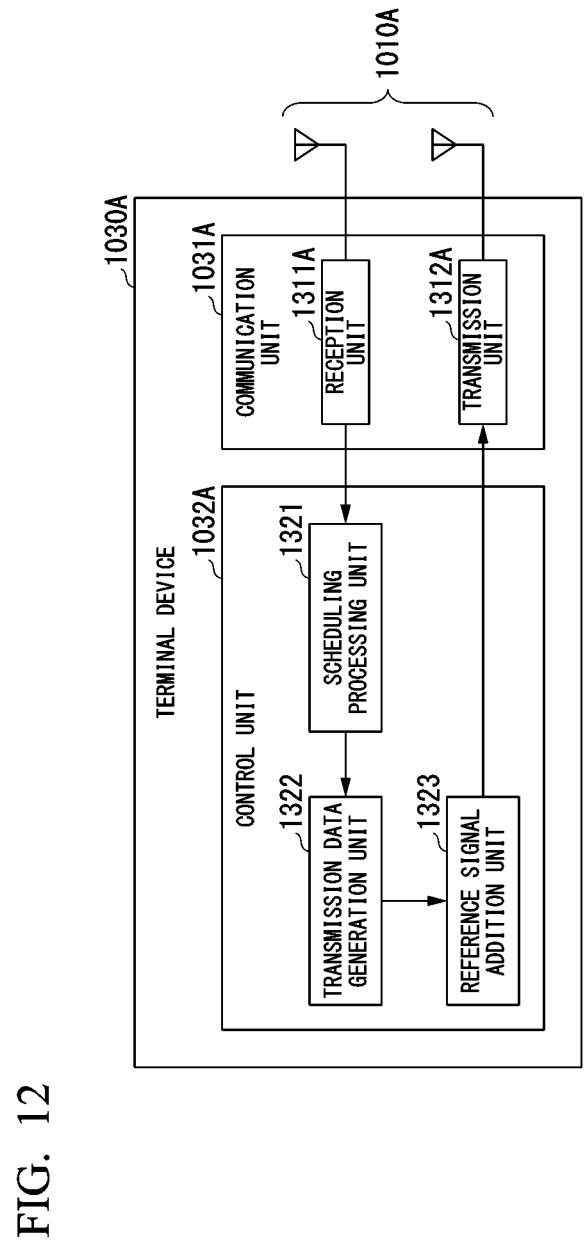
FIG. 12 is a schematic block diagram illustrating a configuration of a terminal device according to the second embodiment of the present invention.

FIG. 12 is a schematic block diagram illustrating a configuration of the terminal device 1030A according to the present embodiment. The terminal device 1030A is configured to include a communication unit 1031A and a control unit 1032A.

The communication unit 1031A is configured to include a reception unit 1311A and a transmission unit 1312A.

The reception unit 1311A receives radio waves of the licensed band transmitted from the small cell base station device 1010A as a received signal. The reception unit 1311A outputs the received signal to a scheduling processing unit 1321 of the control unit 1032A.

The transmission unit 1312A transmits a transmission signal input from a reference signal addition unit 1323 of the control unit 1032A to the small cell base station device 1010A as radio waves of the licensed band.

The communication unit 1031A is different from the communication unit 1031 according to the first embodiment in that the interference reception unit 1315 related to execution of the LBT determination is not included because the licensed band is used.

The control unit 1032A is configured to include the scheduling processing unit 1321, a transmission data generation unit 1322, and the reference signal addition unit 1323. The control unit 1032A is different from the control unit 1032 according to the first embodiment in that the sensing processing unit 1324 and the transmission determination unit 1325 related to execution of the LBT determination are not included because the licensed band is used.

<Scheduling Process>

Figure 13:
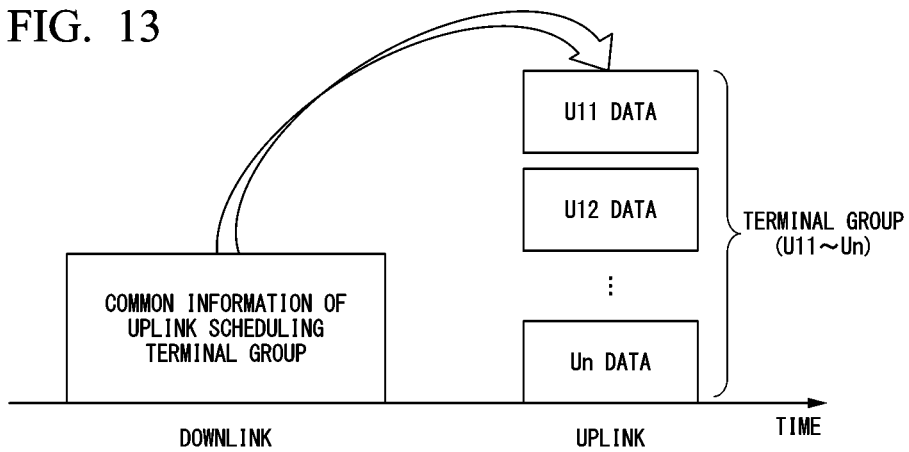
FIG. 13 is a tuning chart illustrating a scheduling process according to the second embodiment of the present invention.

FIG. 13 is a timing chart illustrating a scheduling process according to the present embodiment.

The small cell base station device 1010A transmits uplink scheduling information to each terminal device 1030A within the terminal group in a downlink control signal (PDCCH). In this example, a resource block group is scheduled for a terminal group including the terminal devices 1030A (U11, U12, . . . , Un). A single resource block may be scheduled for a terminal group. Scheduling notification is performed with common uplink scheduling information within the terminal group.

As described above, because radio resources are assigned using one common control channel including common scheduling information to a plurality of terminal devices 1030A, it is possible to save radio resources related to a control signal.

The terminal devices 1030A (U11, U12, . . . , Un) within the terminal group transmit uplink data by using at least some of resource block groups assigned to terminal groups of the terminal devices 1030A. Specifically, the terminal devices 1030A (U11, U12, . . . , Un) transmit uplink data by using a temporally earliest resource block among the assigned resource blocks. Uplink data (U11, U12, . . . , Un) transmitted by the terminal devices 1030A (U11, U12, . . . , Un) is multiplexed within the same resource block and simultaneously received by the small cell base station device 1010A.

Also, because the licensed band is used in the present embodiment, the small cell base station device 1010A and the terminal devices 1030A do not make an LBT determination before data transmission, but the unlicensed band may be used as in the first embodiment.

<Terminal Groups>

Figure 14:
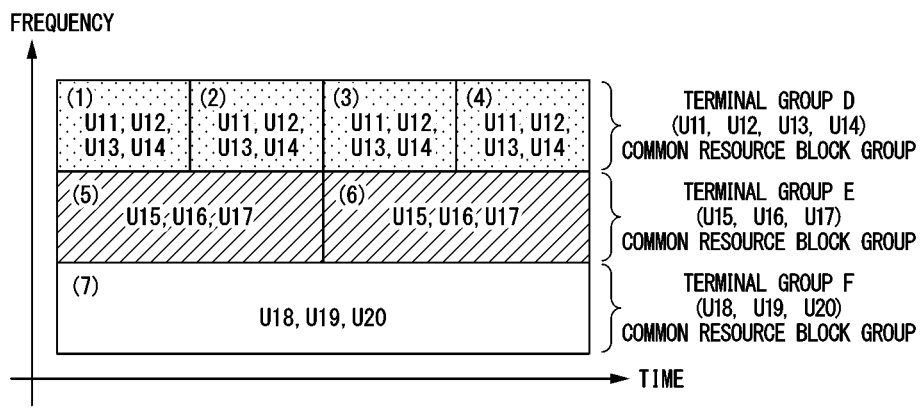
FIG. 14 is a schematic diagram illustrating an example of assignment of terminal groups according to the second embodiment of the present invention.

FIG. 14 is a schematic diagram illustrating an example of assignment of terminal groups according to the present embodiment. In this example, ten terminal devices 1030A (U11, U12, . . . , U20) are divided into three terminal groups D, E, and F and radio resources are assigned thereto. Specifically, a resource block group (a dot shaded part) including resource blocks (1), (2), (3), and (4) is assigned to a terminal group D (U11, U12, U13, U14), a resource block group (a diagonally shaded part) including resource blocks (5) and (6) is assigned to a terminal group E (U15, U16, U17), and a resource block (7) (a non-shaded part) is assigned to a terminal group F (U18, U19, U20).

In this manner, radio resources having different temporal lengths may be assigned to terminal groups. In general, in a wireless communication system, various types of parameters such as a frame structure and a TTI length to be used may differ according to use application of communication and required quality. However, it is possible to efficiently arrange the resource blocks by grouping the terminal devices 1030A having similar characteristics in the same terminal group and assigning radio resources of an appropriate time width. Particularly, in a case that subframe lengths are the same, even in a case that signals from a plurality of terminal devices are multiplexed, it is possible to demodulate the signals from the terminal devices for a short processing time.

<Received Signal of Base Station Device>

Figure 15:
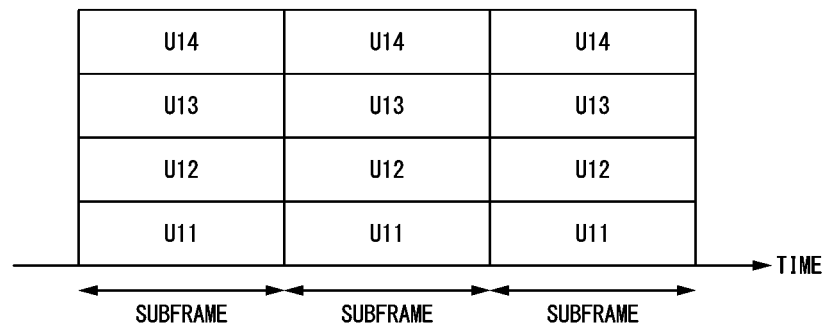
FIG. 15 is a tuning chart illustrating an example of a received signal of a base station device according to the second embodiment of the present invention.

FIG. 15 is a timing chart illustrating an example of a received signal in the small cell base station device 1010A according to the present embodiment. Specifically, FIG. 15 is an example of a received signal from the terminal group D (U11, U12, U13, U14) in the terminal group example of FIG. 14.

A horizontal axis indicates a time direction and U11, U12, U13, and U14 denote received signals transmitted from the terminal devices 1030A with corresponding numbers.

In the present embodiment, unlike the first embodiment, each terminal device 1030A does not make an LBT determination because the licensed band is used. Thus, the terminal device 1030A performs signal transmission in principle by using a scheduled resource block. Because the resource block group of (1), (2), (3) and (4) in FIG. 14 are assigned to the terminal group D, terminal devices 1030A (U11, U12, U13, U14) belonging to the terminal group D first transmit uplink data by using the resource block (1). Thus, the small cell base station device 1010A receives a signal obtained by multiplexing signals (U11, U12, U13, U14) from the terminal devices 1030A (U1, U2, . . . , U4).

<Demodulation Process of Base Station Device>

Figure 16:
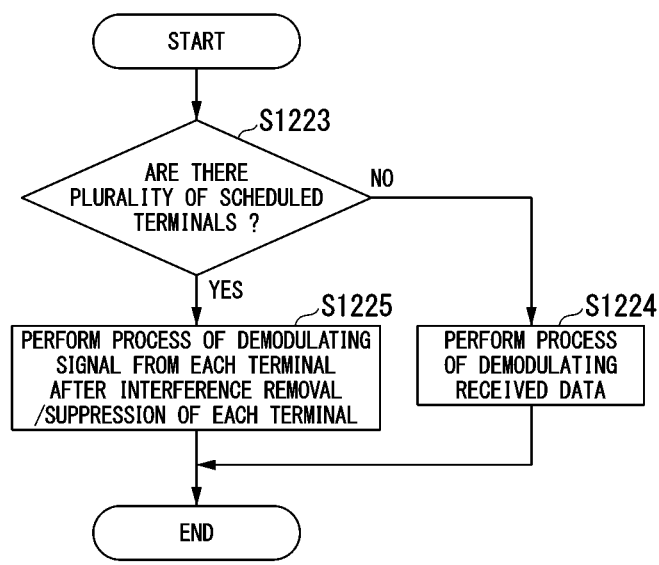
FIG. 16 is a flowchart illustrating a process of demodulating a received signal in the base station device according to the second embodiment of the present invention.

FIG. 16 is a flowchart illustrating a demodulation process of demodulating a received signal in the small cell base station device 1010A according to the present embodiment. (Step S1223)

The terminal identification unit 1132 of the small cell base station device 1010A determines whether a plurality of terminal devices 1030A are assigned to radio resources to be demodulated based on scheduling information created by the scheduling control unit 1131. In a case that a plurality of terminal devices 1030A are assigned, the process proceeds to the processing of step S1225. In a case that a plurality of terminal devices are not assigned, the process proceeds to the processing of step S1224.

Also, in the present embodiment, because the licensed band is used, an uplink signal from the terminal device 1030A is received as scheduled in principle as described above. Accordingly, the processing of terminal identification (step S1121) and terminal presence determination (step S1122) in the first embodiment is unnecessary.

(Step S1224)

The signal demodulation unit 1133 of the small cell base station device 1010A performs a demodulation process of demodulating a received signal. The demodulation process is performed based on a result of channel estimation according to an orthogonal reference signal specific to the terminal device 1030A received from the terminal device 1030A. After the demodulation process is executed, the process is completed.

(Step S1225)

The signal demodulation unit 1133 of the small cell base station device 1010A performs a process of reducing interference between the terminal devices 1030A. The specific processing is similar to the processing of step S1125 in the first embodiment. After the interference reduction process is executed, the signal demodulation unit 1133 performs the demodulation process to complete the process.

SUMMARY OF EMBODIMENT

As described above, a communication system includes a base station device and terminal devices that communicate with the base station device, wherein the base station device includes a scheduling control unit configured to assign radio resources including at least one or more resource blocks to a plurality of terminal devices and a reception processing unit configured to demodulate received signals from the terminal devices and wherein the terminal device include a transmission control unit configured to transmit transmission data by using at least some of the radio resources assigned to the terminal device.

According to this configuration, a plurality of terminal devices share at least one or more resource blocks to transmit data and the transmitted data is received and demodulated by the base station device. Thus, it is possible to improve the utilization efficiency of radio resources while reducing a signal delay.

Also, the transmission control unit of the terminal device adds a reference signal separable for each terminal device to the transmission data and the reception processing unit of the base station device separates the transmission data to which the reference signal is added from the received signal based on the reference signal.

According to this configuration, even in a case that signals from a plurality of terminal devices are multiplexed within a resource block to be demodulated, each transmission data can be separated and demodulated.

Also, the reception processing unit of the base station device reduces interference between the terminal devices in a case that received signals from the plurality of terminal devices are included within a resource block to be demodulated.

According to this configuration, even in a case that signals from a plurality of terminal devices are included within a resource block to be demodulated, interference between the terminal devices can be reduced and reception quality can be improved.

Also, the scheduling control unit of the base station device performs control for transmitting common scheduling information to the plurality of terminal devices by using a common control channel for the plurality of terminal devices.

According to this configuration, radio resources related to control signals can be saved.

Also, the scheduling control unit of the base station device sets an upper limit of the number of terminal devices to which the radio resources are assigned based on a predetermined criterion.

According to this configuration, it is possible to perform interference reduction or demodulation of reliably multiplexed signals.

Also, the scheduling control unit of the base station device sets an upper limit of the number of terminal devices to which radio resources are assigned based on whether or not the reception processing unit can reduce the interference between the terminal devices.

According to this configuration, it is possible to perform interference reduction or demodulation of reliably multiplexed signals.

Also, the scheduling control unit of the base station device determines terminal devices to which radio resources are assigned based on locations of the terminal devices.

According to this configuration, in a case that the terminal device cannot transmit a signal in a certain resource block, it is possible to increase a probability that another terminal can transmit a signal in the resource block. Thus, it is possible to efficiently use radio resources.

Also, the scheduling control unit of the base station device determines terminal devices to which the radio resources are assigned based on quality information received from the terminal devices.

According to this configuration, in a case that the terminal device cannot transmit a signal in a certain resource block, it is possible to increase the probability that another terminal device can transmit a signal in the resource block. Thus, it is possible to efficiently use radio resources.

Also, the above-described embodiment can also be implemented in the following aspects.

A base station device for communicating with a plurality of terminal devices, the base station device including: a scheduling control unit configured to assign radio resources including at least one or more resource blocks to the plurality of terminal devices and a reception processing unit configured to demodulate received signals from the terminal devices.

A terminal device for communicating with a base station device, the terminal device, including: a transmission control unit configured to transmit transmission data by using at least some of radio resources assigned to the terminal device among radio resources including at least one or more resource blocks assigned by the base station device to a plurality of terminal devices.

A communication method of use in a base station device and a plurality of terminal devices, the communication method including the steps of: assigning, by the base station device, radio resources including at least one or more resource blocks to the plurality of terminal devices; and demodulating, by the base station device, received signals from the terminal devices, wherein the terminal device transmits transmission data by using at least some of the radio resources assigned to the terminal device.

Also, some of the small cell base station devices 1010 and 1010A, the macrocell base station device 1020, and the terminal devices 1030 and 1030A in the above-described embodiments, for example, the control unit 1013, the control unit 1013A, all thereof, or the like may be configured to be implemented by a computer. In this case, the functions may be implemented by recording a program for implementing the functions on a computer-readable recording medium and causing a computer system to read and execute the program recorded on the recording medium. Also, it is assumed that the "computer system" described here is a computer system embedded in the small cell base station devices 1010 and 1010A, the macrocell base station device 1020, and the terminal devices 1030 and 1030A and includes an operating system (OS) and hardware such as peripheral devices.

Also, the "computer-readable recording medium" refers to a storage device including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for dynamically holding a program for a short time as in a communication line in a case that the program is transmitted via a network such as the Internet or a communication circuit such as a telephone circuit and a computer-readable recording medium for holding the program for a predetermined time as in a volatile memory inside the computer system including a server and a client in a case that the program is transmitted. Also, the above-described program may be used to implement some of the above-described functions. Further, the program may implement the above-described functions in combination with a program already recorded on the computer system.

Also, some or all of the small cell base station devices 1010 and 1010A, the macrocell base station device 1020, and the terminal devices 1030 and 1030A in the above-described embodiments may be implemented as an integrated circuit such as large scale integration (LSI). Each of the functional blocks of the control unit 1013, the control unit 1013A, or the like may be individually formed as a processor or a part or all thereof may be integrated into a processor. Also, a technique of forming integrated circuitry is not limited to LSI, and may be implemented by dedicated circuitry or a general-purpose processor. Also, in a case that the technology of integrated circuitry with which LSI is replaced emerges with the advancement of semiconductor technology, the integrated circuitry based on the technology may be used.

Although the first and second embodiments of the present invention have been described above in detail with reference to the drawings, specific configurations are not limited to the above-described embodiments and various design modifications and the like can also be made without departing from the scope of the present invention.

For example, the present invention can also be applied to an LTE system (a standalone type unlicensed band LTE system) using only an unlicensed band.

Also, the present invention can be applied to wireless communication systems other than LTE.

Third Embodiment

A third embodiment of the present invention will be described with reference to the drawings.

Figure 17:
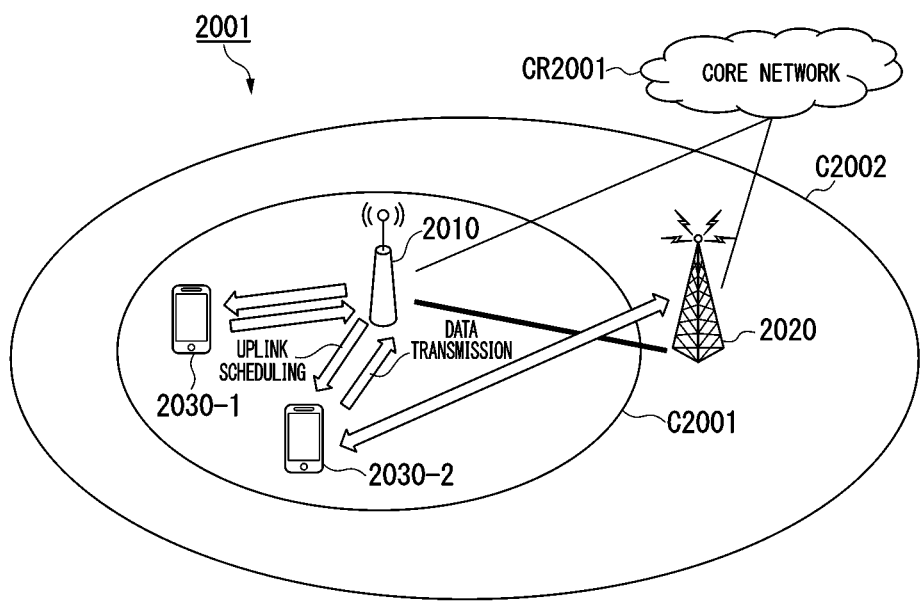
FIG. 17 is a schematic diagram illustrating a configuration example of a communication system according to a third embodiment.

FIG. 17 is a schematic diagram illustrating a configuration example of the communication system 2001 according to the present embodiment.

The communication system 2001 is a communication system that performs wireless communication using a predetermined communication scheme, for example, an LAA scheme. The LAA scheme is a wireless communication scheme proposed in the $3^{rd}$ generation partnership project (3GPP). This scheme is a wireless communication system that performs carrier aggregation (CA) of a licensed band in a primary cell (Pcell: primary cell) and an unlicensed band in a secondary cell (Scell: secondary cell). The carrier aggregation is a technique using a plurality of carrier waves in different frequency bands as one communication circuit.

In the example illustrated in FIG. 17, the communication system 2001 is configured to include a small cell base station device 2010, a macrocell base station device 2020, a terminal device 2030, and a core network CR2001. Although each of the number of small cell base station devices 2010 and the number of macrocell base station devices 2020 is one in each example illustrated in FIG. 17, the number may be two or more. Also, although the number of terminal devices 2030 is two in the example illustrated in FIG. 17, the number may be three or more. In the following description, a plurality of terminal devices 2030 may be distinguished as terminal devices 2030-1, 2030-2, etc.

The small cell base station device 2010 transmits and receives various types of data to and from the terminal device 2030 located in a range which radio waves from the small cell base station device 2010 reach by using an unlicensed band in a secondary cell. In general, a small cell base station device is a base station device having a relatively narrow arrival range of radio waves used for data transmission. A small cell may indicate a small cell base station device as well as the range thereof. The small cell includes a microcell, a nanocell, a picocell, and a femtocell and a radius of the small cell is typically several tens to hundreds of meters or less. The small cell base station device may be used to complement a function of the macrocell base station device. For example, the small cell base station device is installed in a region where a communication capacity is higher such as a region with a high population density or a region where the reception of radio waves from the macrocell base station is difficult such as a mountain, a shadow of a building or another structure, or an underground space. In FIG. 17, a cell C2001 indicates a range which radio waves from the small cell base station device 2010 reach. The small cell base station device 2010 schedules transmission of uplink data of the terminal devices 2030-1 and 2030-2 and determines transmission parameters thereof. More specifically, the small cell base station device 2010 assigns a radio resource block group including a plurality of radio resource blocks (RBs: resource blocks). A radio resource block is also simply referred to as a resource block.

The macrocell base station device 2020 transmits and receives various types of data to and from the terminal device 2030 located in a range which radio waves from the macrocell base station device 2020 reach using the licensed band in the primary cell. The licensed band represents a frequency band required to be licensed. In general, a macrocell base station device is a base station device having a relatively wide range in which radio waves used for data transmission reach. A macrocell may represent a macrocell base station device as well as the range thereof. A radius of the range of the macrocell is typically several hundreds of meters to several kilometers. In FIG. 17, a cell C2002 has a range which radio waves from the macrocell base station device 2020 reach.

The small cell base station device 2010 and the macrocell base station device 2020 are connected to the core network CR2001 via an S1 interface, respectively, and are connected to each other. The small cell base station device 2010 and the macrocell base station device 2020 may be directly connected via a relatively high-speed/small-delay ideal dedicated circuit (ideal backhaul) or connected via an X2 interface. In a connection via the X2 interface, a relatively low-speed or medium-delay non-ideal dedicated circuit (non-ideal backhaul) may be used. These dedicated circuits may be a wireless or wired line.

The terminal device 2030 is a communication device that performs wireless communication with a communication-partner device via the communication system 2001. The terminal device 2030 is, for example, a user device such as a portable phone, a tablet terminal device, or a wireless communication card. In the example illustrated in FIG. 17, the terminal devices 2030-1 and 2030-2 perform uplink data communication via the small cell base station device 2010. The terminal devices 2030-1 and 2030-2 use resources assigned to the terminal devices 2030-1 and 2030-2 to transmit data to the small cell base station device 2010.

Also, the small cell base station device 2010 and the macrocell base station device 2020 may be integrated as a single base station device.

(Small Cell Base Station Device)

Next, a configuration of the small cell base station device 2010 according to the present embodiment will be described.

Figure 18:
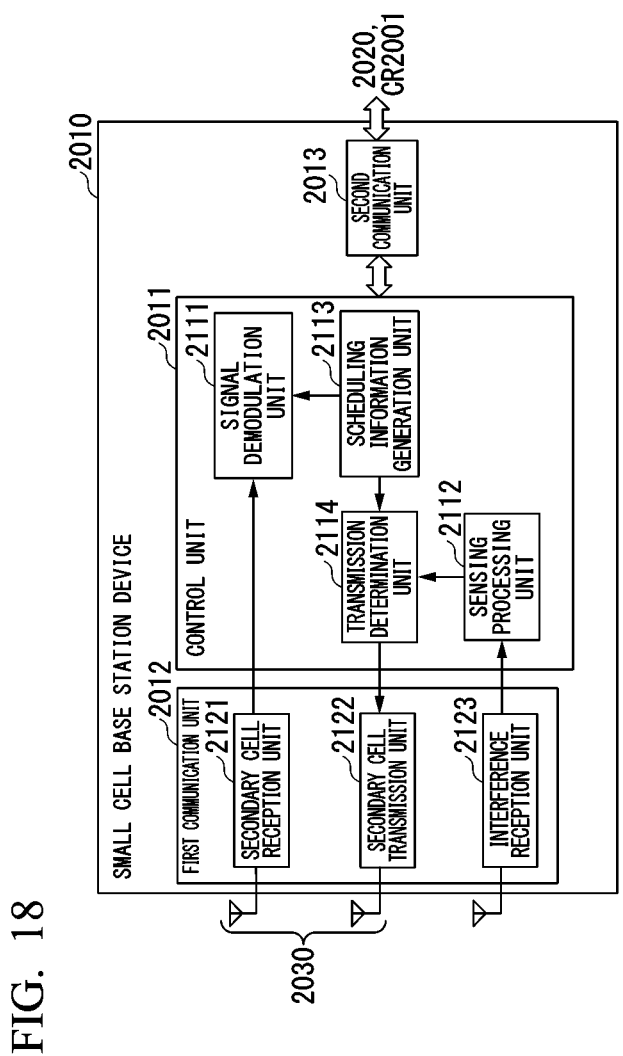
FIG. 18 is a schematic block diagram illustrating a configuration of a small cell base station device according to the third embodiment.

FIG. 18 is a schematic block diagram illustrating an example of the configuration of the small cell base station device 2010 according to the present embodiment. The small cell base station device 2010 is configured to include a control unit 2011, a first communication unit 2012, and a second communication unit 2013.

The control unit 2011 is configured to include a signal demodulation unit 2111, a sensing processing unit 2112, a scheduling information generation unit 2113, and a transmission determination unit 2114.

The signal demodulation unit 2111 receives a received signal from the terminal device 2030 via the secondary cell reception unit 2121 of the first communication unit 2012. The signal demodulation unit 2111 demodulates uplink data from the terminal device 2030 with transmission parameters (to be described below) determined by the scheduling information generation unit 2113 on the received signal according to scheduling. The transmission parameters include, for example, a resource block and an MCS value. A process to be performed by the signal demodulation unit 2111 includes a process of extracting a received signal assigned to a specified resource block, a process of demodulating an acquired received signal in a decoding scheme corresponding to a modulation scheme specified by an MCS value, and a process of acquiring uplink data by decoding encoded data obtained through demodulation in a decoding scheme corresponding to an encoding scheme specified by an MCS value.

The sensing processing unit 2112 receives a received signal via the interference reception unit 2123 of the first communication unit 2012 during a listen before talk (LBT) period. The sensing processing unit 2112 measures reception power of the received signal and outputs the measured reception power to the transmission determination unit 2114. LBT refers to detecting and measuring a received signal from a device outside an own system before data is transmitted and is also called clear channel assessment (CCA). The LBT period represents a period during which LBT is performed. The LBT period is a predetermined period determined according to a communication system standard for confirming whether or not there is another communication system in which communication is being performed (whether the state is a busy state or an idle state), for example, immediately before transmission of uplink data from the terminal device 2030 starts. Also, the LBT period may differ according to quality of service (QoS), the number of busy state determinations, or the like. This predetermined period may be, for example, 0.5 ms corresponding to one slot, 1 ms corresponding to one subframe, or the like. For example, the LBT period may be provided for every predetermined period (e.g., 10 ms corresponding to one frame).

The scheduling information generation unit 2113 determines transmission parameters of terminal uplink data (PUSCH: Physical Uplink Shared Channel or the like) based on quality information reported from each terminal device 2030.

The transmission parameters include, for example, a resource block or a resource block group including a plurality of resource blocks, a transmission rate (MCS: Modulation and Coding Scheme), and a transmitter power control (TPC) (transmission power control) command as elements thereof. The scheduling information generation unit 2113 generates uplink scheduling information (UL: uplink grant) indicating a determined transmission parameter. The scheduling information generation unit 2113 includes uplink scheduling information generated by an individual terminal device 2030 in a downlink control signal (PDCCH: Physical Downlink Control Channel or the like) and transmits the downlink control signal to the terminal device 2030 via the first communication unit 2012. In the following description, the determination of the transmission parameters may be referred to as scheduling.

The quality information is generated in the control unit 2031 (to be described below) of the terminal device 2030 and transmitted together with uplink data. The quality information may be transmitted separately from the uplink data.

For example, the reception power of radio waves received by the terminal device 2030 from each base station device is used as the quality information to be reported by the terminal device 2030 to the macrocell base station device 2020 or the small cell base station device 2010. The scheduling information generation unit 2113 may use reception power measured during the LBT period set in the control unit 2031 of the terminal device 2030 and LBT information indicating a determination of the availability of transmission as an example of the quality information. Also, the control unit 2031 of the terminal device 2030 may transmit the LBT information generated by the control unit 2031 to the macrocell base station device 2020 by using the licensed band. The macrocell base station device 2020 may transmit the LBT information received from the terminal device 2030 to the small cell base station device 2010 via a dedicated circuit. Because the LBT information is transmitted via the dedicated circuit, the LBT information is not affected by an environment as much as transmission using the unlicensed band.

The scheduling information generation unit 2113 outputs the generated uplink scheduling information to the transmission determination unit 2114 and outputs the determined transmission parameters to the signal demodulation unit 2111.

A resource block is resource information indicating a minimum unit in a case that a frequency band and a subframe used for transmission of various types of data are assigned. The scheduling information generation unit 2113 determines a resource block having highest communication quality as a resource block for use in transmission of data to the terminal device 2030 with reference to acquired quality information. In a case that a plurality of terminal devices 2030 are connected, the scheduling information generation unit 2113 determines a plurality of resource blocks for each terminal device 2030 so that the entire communication quality is highest without overlapping among the plurality of terminal devices 2030. The number of resource blocks to be set by the scheduling information generation unit 2113 for one terminal device 2030 at a time may be fixed to a predetermined fixed number (e.g., 3) or may be variable in a predetermined range (e.g., 2 to 5). Here, the scheduling information generation unit 2113 determines a resource block to be used for uplink data transmission from the terminal device 2030 among resource blocks assigned to each terminal device 2030. In a case that there is an unused resource block among resource blocks assigned to a certain terminal device 2030, the scheduling information generation unit 2113 assigns the unused resource block to another terminal device 2030.

The modulation parameter is represented by, for example, a modulation and coding scheme (MCS) value. The MCS value is an index indicating a combination of a modulation scheme and a coding rate. The MCS value is set in ascending order of a transmission rate according to the combination. Accordingly, the smaller the MCS value, the higher the resistance to interference and the lower the transmission rate.

Also, the smaller the numerical value for each modulation scheme, the higher the resistance to interference and the lower the transmission rate. The higher the coding rate, the lower the resistance to interference and the higher the transmission rate. The TPC command is a command for controlling the transmission power of the uplink data from the terminal device 2030.

The TPC command includes a TPC instruction. The TPC instruction is a target value of transmission power in which a transmission power difference from a predetermined criterion value is expressed by dB. The larger the value of the TPC instruction, the greater the transmission power. Accordingly, the larger the value of the TPC instruction, the higher the resistance to interference. Therefore, the scheduling information generation unit 2113 determines a parameter having higher resistance to interference in a case that the acquired communication quality is lower as the transmission parameter and determines a parameter having lower resistance to interference in a case that the acquired communication quality is higher as the transmission parameter.

The transmission determination unit 2114 determines whether or not to transmit downlink data (an idle or busy state) based on reception power input from the sensing processing unit 2112. The downlink data includes uplink scheduling information input from the scheduling information generation unit 2113. For example, the transmission determination unit 2114 determines to transmit downlink data in a case that the input reception power is less than a predetermined reception power threshold value and determines not to transmit downlink data in a case that the input reception power is greater than or equal to the predetermined reception power threshold value. In a case that it is determined that transmission is performed, the transmission determination unit 2114 transmits downlink data as a transmission signal to the terminal device 2030 via the first communication unit 2012 in a subframe immediately after the determination. The transmission determination unit 2114 transmits scheduling information within the downlink data as a downlink control signal (PDCCH or the like). In a case that it is determined that transmission is not performed, the transmission determination unit 2114 does not transmit downlink data in an immediately subsequent subframe and further waits for a transmission opportunity in the next subframe.

In addition, the control unit 2011 performs various control related to communication with the terminal device 2030. Such control includes, for example, various types of processes on transmission data and received data, control of carrier frequencies used for transmission and reception in the first communication unit 2012, registration of a location of the terminal device 2030, a connection with the terminal device 2030, a handover, and the like.

The first communication unit 2012 is configured to include a secondary cell reception unit 2121, a secondary cell transmission unit 2122, and an interference reception unit 2123. In an example illustrated in FIG. 18, the secondary cell reception unit 2121, the secondary cell transmission unit 2122, and the interference reception unit 2123 are represented as components separate from each other.

The secondary cell reception unit 2121 receives radio waves of the unlicensed band from the terminal device 2030 as a received signal. The secondary cell reception unit 2121 outputs the received signal to the control unit 2011.

The secondary cell transmission unit 2122 transmits a transmission signal input from the control unit 2011 as radio waves of the unlicensed band to the terminal device 2030.

The interference reception unit 2123 receives radio waves of a part or all of the unlicensed band as a received signal from another signal source. The received signal received by the interference reception unit 2123 may be referred to as an interference signal. The other signal source can typically be a component device of a wireless communication system separate from the communication system 2001. A separate wireless communication system includes a wireless communication system using another LAA scheme as a communication scheme, a wireless communication system using a communication scheme defined by IEEE 802.11, and the like. The interference reception unit 2123 outputs the received signal to the sensing processing unit 2112.

The second communication unit 2013 transmits and receives various types of data to and from each component device of the core network CR2001 and the macrocell base station device 2020.

The macrocell base station device 2020 has a configuration similar to that of the small cell base station device 2010. However, the macrocell base station device 2020 includes a primary cell reception unit and a primary cell transmission unit instead of the secondary cell reception unit 2121 and the secondary cell transmission unit 2122. The primary cell reception unit receives radio waves transmitted from the terminal device 2030 by using the licensed band as a received signal. The primary cell transmission unit transmits a transmission signal input from the transmission determination unit as radio waves to the terminal device 2030.

Also, in a case that the communication system 2001 performs scheduling control of communication between the macrocell base station device 2020 and the terminal device 2030 and scheduling control of communication between the small cell base station device 2010 and the terminal device 2030 in a single scheduling information generating unit, the scheduling information generation unit may be mounted on the macrocell base station device 2020 or may be mounted on the small cell base station device 2010. In a case that the scheduling information generation unit is mounted on the macrocell base station device 2020, the scheduling information generation unit 2113 illustrated in FIG. 18 does not exist. Each unit of the small cell base station device is subjected to scheduling control based on the scheduling information received from the macrocell base station device 2020 via the second communication unit 2013.

The scheduling information generation unit may be mounted on each of the macrocell base station device 2020 and the small cell base station device 2010. In particular, in a case that the macrocell base station device 2020 and the small cell base station device 2010 are connected by a non-ideal backhaul or in a case that they are connected via the X2 interface, a scheduling delay occurs. Thus, each base station device includes a scheduling generation unit, thereby reducing such a delay.

(Terminal Device)

Next, a configuration of the terminal device 2030 according to the present embodiment will be described.

Figure 19:
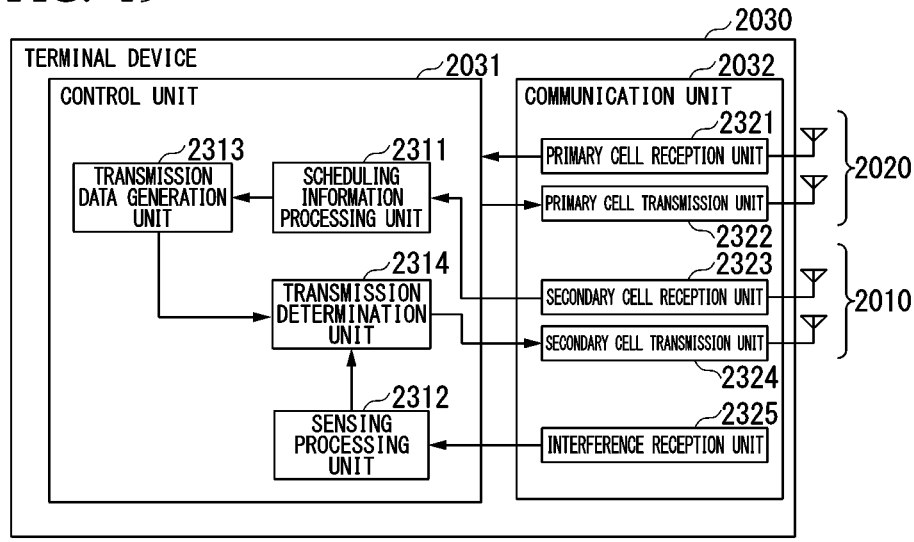
FIG. 19 is a schematic block diagram illustrating an example of a configuration of a terminal device according to the third embodiment.

FIG. 19 is a schematic block diagram illustrating an example of a configuration of the terminal device 2030 according to the present embodiment.

The terminal device 2030 is configured to include a control unit 2031 and a communication unit 2032. The control unit 2031 is configured to include a scheduling information processing unit 2311, a sensing processing unit 2312, a transmission data generation unit 2313, and a transmission determination unit 2314.

The scheduling information processing unit 2311 receives a received signal from the small cell base station device 2010 via the secondary cell reception unit 2323 of the communication unit 2032. The scheduling information processing unit 2311 demodulates the received signal and acquires the uplink scheduling information (UL grant) to be transmitted as a downlink control signal (PDCCH or the like). The scheduling information processing unit 2311 extracts transmission parameters of terminal uplink data (PUSCH or the like) from the acquired uplink scheduling information. The transmission parameters include the above-described resource block or resource block group, a transmission rate (MCS), a TPC command, and the like. In the case of the cross-scheduling (to be described below), the scheduling information processing unit 2311 acquires uplink scheduling information from the received signal received from the macrocell base station device 2020 via the primary cell reception unit 2321 of the communication unit 2032. The scheduling information processing unit 2311 outputs the acquired uplink scheduling information to the transmission data generation unit 2313.

The sensing processing unit 2312 receives the received signal via the interference reception unit 2325 of the communication unit 2032 during the LBT period. The LBT period is a predetermined period until a start of transmission of the uplink data. The sensing processing unit 2312 measures reception power of the received signal and outputs the measured reception power to the transmission determination unit 2314.

The transmission data generation unit 2313 generates uplink data by using transmission parameters input from the scheduling information processing unit 2311. More specifically, the transmission data generation unit 2313 acquires data to be transmitted as uplink data to a transmission destination device, encodes the acquired data in an encoding scheme indicated by the MCS value, and modulates the encoded data in a modulation scheme indicated by the MCS. The data to be transmitted is, for example, user data generated by executing a command indicated by an application program. The transmission data generation unit 2313 controls an intensity of the uplink data so that the transmission power of the uplink data becomes transmission power indicated by the TPC command. The transmission data generation unit 2313 outputs the uplink data of which transmission power is controlled and information of a resource block indicated by the transmission parameter to the transmission determination unit 2314.

The transmission determination unit 2314 determines whether or not to transmit uplink data input from the transmission data generation unit 2313 for each subframe within a resource block group indicated by a transmission parameter input from the transmission data generation unit 2313 based on the reception power input from the sensing processing unit 2312. In a case that the input reception power is less than a predetermined energy detection (ED) threshold value, the transmission determination unit 2314 determines to transmit uplink data (an idle state). In a case that the input reception power is greater than or equal to the ED threshold value, the transmission determination unit 2314 determines not to transmit uplink data (a busy state) and waits for a transmission opportunity in the next subframe. However, the entire assignment of the uplink transmission data within the resource block group assigned to the terminal device 2030 is not completed and the transmission determination unit 2314 waits for the next transmission parameter to be input for the remaining part of the data. The transmission determination unit 2314 determines whether or not transmission is possible for each subframe within the resource block group indicated by the next transmission parameter and sequentially transmits data that has not been transmitted using a resource block of the subframe determined to be transmitted. Accordingly, the transmission determination unit 2314 iterates this process until there is no uplink data that has not been transmitted as a transmission target. The availability of transmission of the uplink data determined in the transmission determination unit 2314 and the value of the input reception power correspond to the above-described LBT information.

In addition, the control unit 2031 performs various control related to communication with the small cell base station device 2010 and the macrocell base station device 2020. Such control includes, for example, various types of processes on transmission data and received data, control of carrier frequencies used for transmission and reception in the communication unit 2032, location registration via the small cell base station device 2010 or the macrocell base station device 2020, a connection with the small cell base station device 2010 or the macrocell base station device 2020, a handover, and the like.

The communication unit 2032 is configured to include a primary cell reception unit 2321, a primary cell transmission unit 2322, a secondary cell reception unit 2323, a secondary cell transmission unit 2324, and an interference reception unit 2325.

The primary cell reception unit 2321 receives radio waves of the licensed band transmitted from the macrocell base station device 2020 which is the primary cell as a received signal. The primary cell reception unit 2321 outputs the received signal to the control unit 2031.

The primary cell transmission unit 2322 transmits a transmission signal input from the control unit 2031 as radio waves of the licensed band to the macrocell base station device 2020.

The secondary cell reception unit 2323 receives the radio waves of the unlicensed band as a received signal from the small cell base station device 2010 that is a secondary cell. The secondary cell reception unit 2323 outputs the received signal to the control unit 2031.

The secondary cell transmission unit 2324 transmits the transmission signal input from the control unit 2031 as radio waves of an unlicensed band to the small cell base station device 2010.

The interference reception unit 2325 receives radio waves of a part or all of the unlicensed band as a received signal from another signal source. There is a possibility that the received signal will interfere with a received signal from the small cell base station device 2010 and a transmission signal to the small cell base station device. The interference reception unit 2325 outputs the received signal to the sensing processing unit 2312.

Also, in the example illustrated in FIG. 19, the primary cell reception unit 2321, the primary cell transmission unit 2322, the secondary cell reception unit 2323, the secondary cell transmission unit 2324, and the interference reception unit 2325 are represented as separate components. A part of a configuration of each of the primary cell reception unit 2321, the primary cell transmission unit 2322, the secondary cell reception unit 2323, the secondary cell transmission unit 2324, and the interference reception unit 2325, for example, an antenna, may be common.

(Scheduling Notification Method)

Figure 20:
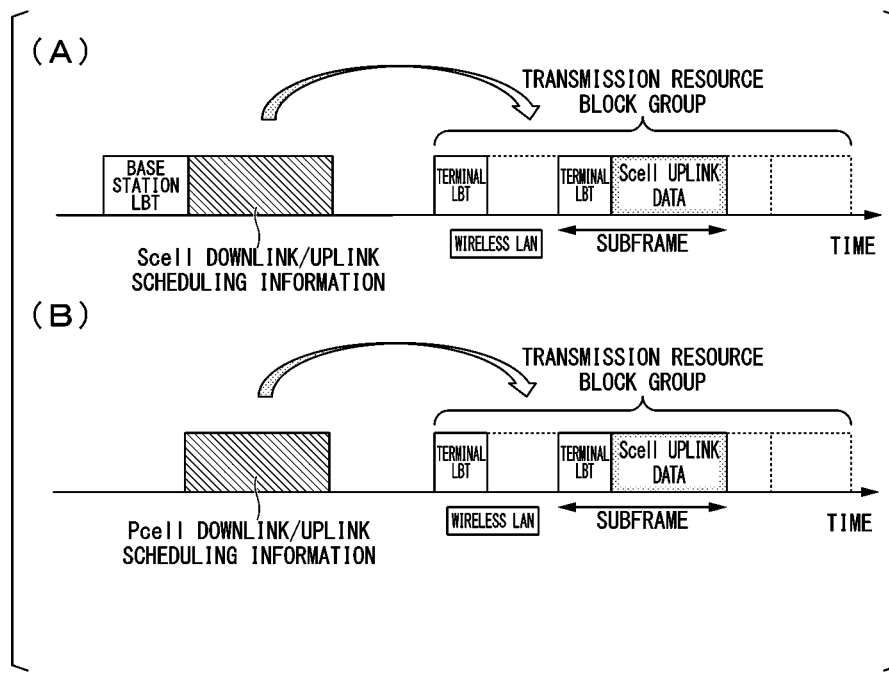
FIG. 20 is a diagram illustrating an example of a scheduling notification method according to the third embodiment.

Next, a scheduling notification method according to the present embodiment will be described. The scheduling notification method includes self-scheduling and cross-scheduling. The self-scheduling is a technique in which a base station device serving as a transmission destination of uplink data generates uplink scheduling information related to the data and notifies a terminal device of a transmission source of the uplink data of the generated scheduling information. Examples of the configurations illustrated in FIGS. 17 to 19 are based on the self-scheduling. As illustrated in FIG. 20(A), the transmission determination unit 2114 of the small cell base station device 2010 transmits the uplink scheduling information (Scell downlink/uplink scheduling information) generated by the scheduling information generation unit 2113 to the terminal device 2030. In a case that the availability of transmission of the uplink scheduling information is determined, the sensing processing unit 2112 of the small cell base station device 2010 performs LBT immediately before the transmission. The transmission determination unit 2114 determines the availability of transmission based on reception power of the received signal from the interference reception unit 2123 as a result of LBT. In a case that it is determined that transmission is performed, the uplink scheduling information is transmitted to the terminal device 2030. The uplink scheduling information includes information of a resource block group including a plurality of resource blocks assigned to the terminal device 2030 for transmission of uplink data.

The sensing processing unit 2312 of the terminal device 2030 performs LBT on the received signal from the interference reception unit 2325 within a predetermined LBT period within the resource block group indicated by the uplink scheduling information. A subframe in which LBT is first performed is, for example, after four subframes from a subframe in which uplink scheduling information is received. Based on a result of LBT, the transmission determination unit 2314 determines whether or not uplink data (Scell uplink data) can be transmitted for each subframe. The transmission determination unit 2314 transmits the uplink data to the small cell base station device 2010 by using the resource block assigned to the subframe determined to be transmitted. In an example illustrated in FIG. 20(A), no uplink data is transmitted because it is determined that a result of LBT indicates a busy state in first and third subframes in the resource block group. Also, uplink data is transmitted because it is determined that a result of LBT indicates an idle state in the second subframe within the resource block group.

The cross-scheduling is a technique in which a base station device (cell) separate from a base station device (cell) serving as a transmission destination of uplink data generates uplink scheduling information related to the data and transmits the generated uplink scheduling information to a terminal device of a transmission source of the uplink data. That is, whether the base station device that generates and transmits the uplink scheduling information is the small cell base station device 2010 or the macrocell base station device 2020 differs according to the scheduling notification method. In the cross-scheduling, as illustrated in FIG. 20(B), the transmission determination unit of the macrocell base station device 2020 transmits uplink scheduling information (Pcell downlink/uplink scheduling information) generated by the scheduling information generation unit of the macrocell base station device 2020 to the terminal device 2030. In this case, the transmission determination unit of the macrocell base station device 2020 may not perform LBT. Based on the uplink scheduling information received from the macrocell base station device 2020, the terminal device 2030 performs a transmission process on uplink data as in the case of the self-scheduling. The base station device of the uplink data transmission destination serves as the small cell base station device 2010. Also, in the cross-scheduling, the scheduling information generation unit 2113 may be omitted in the small cell base station device 2010.

(Resource Block Assignment)

Figure 21:
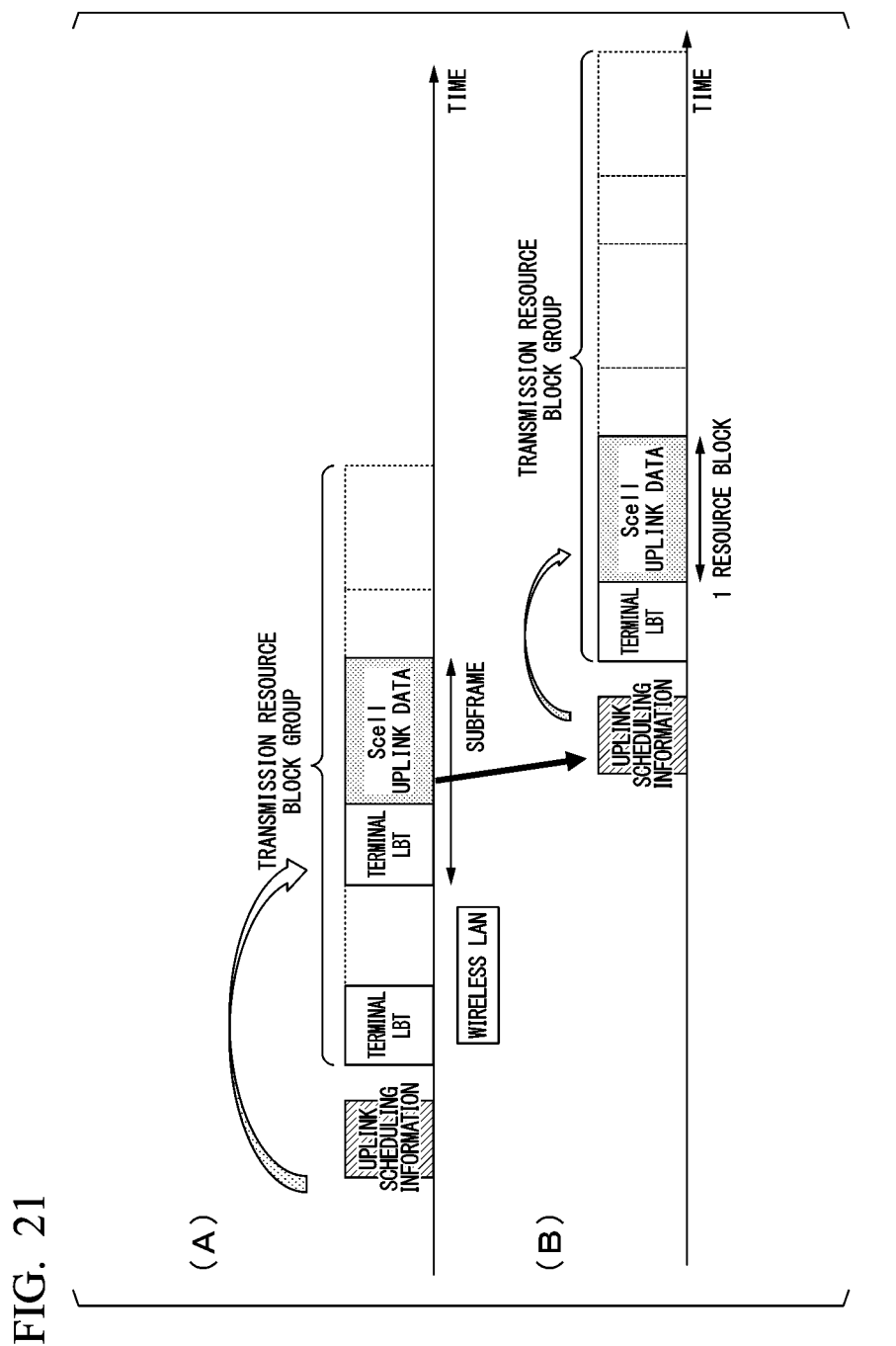
FIG. 21 is a diagram illustrating an example of resource block assignment according to the third embodiment.

Next, an example of resource block assignment according to the present embodiment will be described with reference to FIG. 21. A technique to be described below is common regardless of whether the scheduling notification method is self-scheduling or cross-scheduling. In the following description, the self-scheduling will be taken as an example. Also, terminal devices connected to the small cell base station device 2010 are assumed to be the two terminal devices 2030-1 and 2030-2. In the scheduling information generation unit 2113 of the small cell base station device 2010 and the transmission data generation unit 2313 of the terminal device 2030, an upper limit value N of the number of resource blocks for use in transmission by the terminal device 2030 may be predetermined for one resource block group indicated by uplink scheduling information.

Even in a case that the transmission determination unit 2314 of the terminal device 2030 holds or leaves other data to be transmitted, after the uplink data is transmitted using N resource blocks, the transmission of uplink data including data that is not transmitted until the next uplink scheduling information is received is not performed.

The transmission determination unit 2314 transmits uplink data including data of a transmission target by using a maximum of N resource blocks based on the next uplink scheduling information to be received.

In a case that the uplink data is received using the N resource blocks from the terminal device 2030, the scheduling information generation unit 2113 of the small cell base station device 2010 determines all resource blocks included in a resource block group allocated to the terminal device 2030 and included in a subframe after a subframe in which an $N^{th}$ resource block is transmitted as unused resource blocks. The scheduling information generation unit 2113 assigns at least a part of the resource block group determined to be an unused resource block to a terminal device 2030 other than the terminal device 2030 transmitting the uplink data.

FIGS. 21(A) and 21(B) illustrate scheduling for the terminal devices 2030-1 and 2030-2. The scheduling information generation unit 2113 of the small cell base station device 2010 assigns a resource block group including a plurality of resource blocks to the terminal device 2030-1. The transmission determination unit 2114 transmits uplink scheduling information indicating information of the assigned resource block group (uplink scheduling information) to the terminal device 2030-1. In the example illustrated in FIG. 21(A), a resource block group (a transmission resource block group) assigned to the terminal device 2030-1 extends across three subframes. The sensing processing unit 2312 of the terminal device 2030-1 performs LBT within a predetermined period from the start of each subframe within the resource block group indicated by the uplink scheduling information. The transmission determination unit 2314 of the terminal device 2030-1 determines whether or not to transmit uplink data for each subframe to which a resource block is assigned based on a result of LBT. In the example illustrated in FIG. 21(A), it is determined that uplink data is not transmitted in a first subframe among the three subframes and it is determined that uplink data is transmitted in a second subframe. This is because communication is performed through a wireless LAN that is separate from the communication system 2001 according to the present embodiment in a section of the first subframe. Also, a resource block of a third subframe is left as an unused resource block.

The transmission determination unit 2314 transmits uplink data (Scell uplink data) to the small cell base station device 2010 by using a resource block assigned to the second subframe determined to be transmitted.

The scheduling information generation unit 2113 of the small cell base station device 2010 detects a resource block unused in transmission of uplink data based on a received signal from the terminal device 2030 in the resource block group assigned to the terminal device 2030-1. Assuming that N=1, the scheduling information generation unit 2113 of the small cell base station device 2010 can determine that resources included in the remaining subframe are an unused resource block in the step in which the uplink data has been received. Thus, the scheduling information generation unit 2113 can assign a resource block group including the unused resource block to the terminal device 2030-2 separate from the terminal device 2030-1 or still another terminal device. In a case that resource blocks are assigned to the terminal device 2030-2, the scheduling information generation unit 2113 transmits uplink scheduling information indicating a resource block group including the assigned resource blocks to the terminal device 2030-2. In the example illustrated in FIG. 21(B), the resource block group (a transmission resource block group) assigned to the terminal device 2030-2 extends across three subframes. The sensing processing unit 2312 of the terminal device 2030-2 performs LBT within a predetermined period from the start of each subframe within the resource block group indicated by the uplink scheduling information. The transmission determination unit 2314 of the terminal device 2030-2 determines whether or not to transmit uplink data for each subframe to which the resource block is assigned based on a result of LBT. In the example illustrated in FIG. 21(B), the transmission determination unit 2314 determines to transmit uplink data in a first subframe among the three subframes and uses a resource block within the subframe to transmit the uplink data to the small cell base station device 2010.

Also, the control unit 2031 of the terminal device 2030 may transmit information of an upper limit value N of the number of resource blocks to the small cell base station device 2010 together with a communication start request. The scheduling information generation unit 2113 of the small cell base station device 2010 sets the information of N received from the terminal device 2030 in the control unit 2031. Using the set N information, the scheduling information generation unit 2113 determines an unused resource block among the resource blocks assigned to the terminal device 2030. Also, instead of the upper limit value N of the number of resource blocks, an upper limit value of an amount of information of data of a transmission target may be used for the transmission of uplink data and the determination of an unused resource block. The amount of information is specified by, for example, the number of bytes or the like.

As described above, the base station device according to the present embodiment includes the scheduling information generation unit 2113 configured to assign a plurality of resource blocks of uplink data to a plurality of terminal devices 2030 and generate scheduling information indicating the allocated resource blocks and the signal demodulation unit 2111 configured to demodulate uplink data received in a resource block. The scheduling information generation unit 2113 assigns an unused resource block that is not used for transmission of uplink data among resource blocks assigned to at least one terminal device 2030 of the plurality of terminal devices 2030 to another terminal device 2030.

According to this configuration, the scheduling information generation unit 2113 assigns an unused resource block that is not used for transmission of uplink data from at least one terminal device 2030 to another terminal device 2030. Even in a case that a plurality of resource blocks are assigned, an unused resource block that can be caused by a reception environment can be used for transmission of uplink data from another terminal device. Thus, the waste of limited resource blocks is reduced and unused resource blocks are effectively used. This is compatible with efficient transmission of uplink data without waiting for assignment of the next resource block.

Fourth Embodiment

Next, a fourth embodiment of the present invention will be described. Components that are the same as those of the third embodiment are denoted by the same reference signs and the above description thereof is applied. Differences from the third embodiment will be mainly described below. Although an example in which the scheduling notification method is mainly self-scheduling by the small cell base station device 2010 is taken in the following description, the scheduling notification method may be applied to cross-scheduling by the macrocell base station device 2020.

As described above, the transmission determination unit 2314 of the terminal device 2030 determines whether or not to transmit uplink data for each subframe to which a resource block is assigned based on a result of LBT. The transmission determination unit 2314 transmits uplink data to the small cell base station device 2010 by using the assigned resource block in a case that determining to transmit. The transmission determination unit 2314 sequentially iterates this process until there is no uplink data that is not transmitted as a transmission target. In the present embodiment, the transmission determination unit 2314 adds an uplink data end flag (whose value is '0') indicating that transmission of uplink data is continued to a resource block of a subframe in which transmission of uplink data is continued and data transmission does not end. The transmission determination unit 2314 adds an uplink data end flag (whose value is '1') indicating the end of data transmission to the resource block of the subframe in which the transmission of the uplink data ends. The transmission determination unit 2314 transmits the uplink data to which the uplink data end flag is added to the small cell base station device 2010 by using the assigned resource block. In the following description, the uplink data end flag whose value is 0 or 1 may be referred to as flag 0 or flag 1.

The scheduling information generation unit 2113 of the small cell base station device 2010 detects uplink data and an uplink data end flag from the received signal transmitted using the resource block assigned to each terminal device 2030. In a case that the value of the detected uplink data end flag is 0, the scheduling information generation unit 2113 determines that the transmission of the uplink data is continued and maintains the resource block assigned to the terminal device 2030 without any change. In a case that the value of the detected uplink data end flag is 1, the scheduling information generation unit 2113 determines that the transmission of the uplink data has ended. The scheduling information generation unit 2113 sets a plurality of resource blocks so that at least some of unused resource blocks assigned to the terminal device 2030 (e.g., the terminal device 2030-1) are included in another terminal device 2030 (e.g., the terminal device 2030-2). The scheduling information generation unit 2113 generates uplink scheduling information including information of resource blocks assigned to another terminal device and transmits the generated uplink scheduling information to the other terminal device 2030 to which the resource blocks are assigned.

(Resource Block Assignment)

Figure 22:
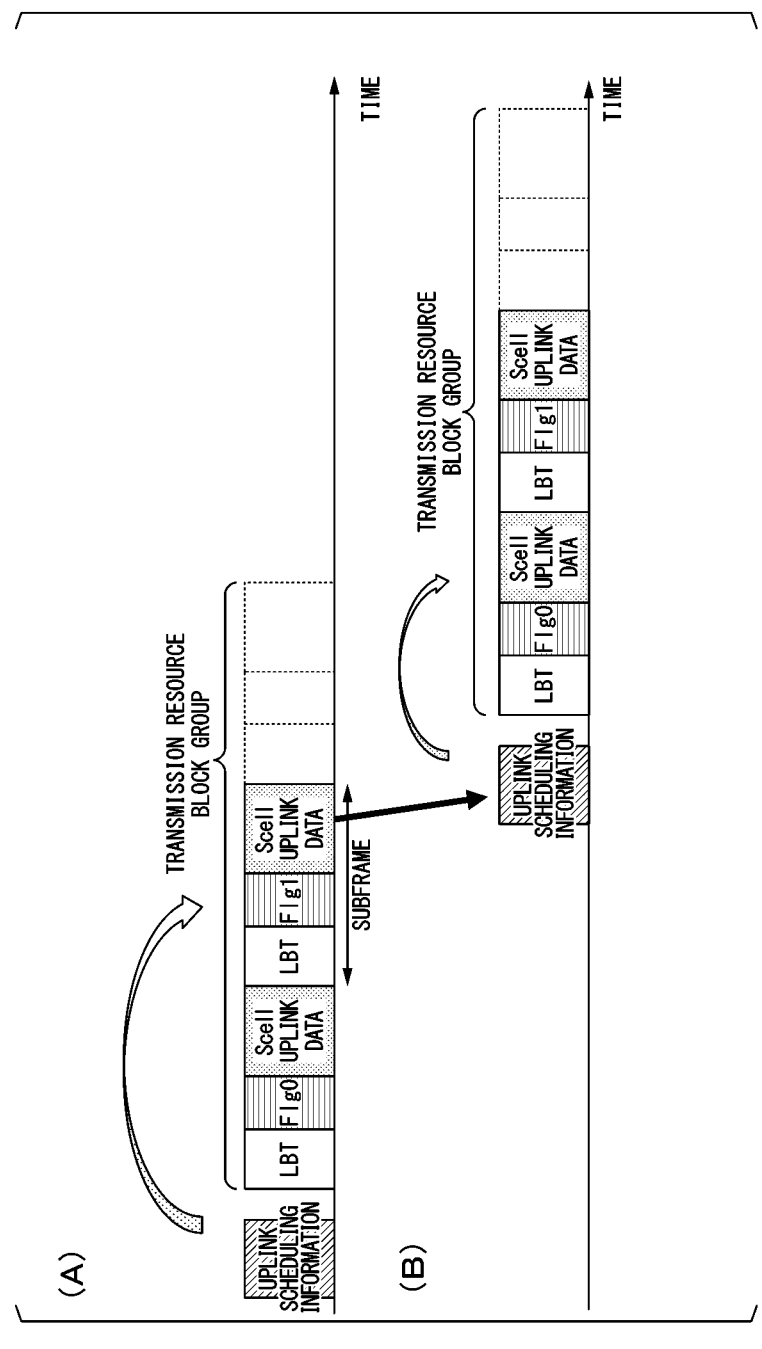
FIG. 22 is a diagram illustrating an example of resource block assignment according to a fourth embodiment.

Next, an example of resource block assignment according to the present embodiment will be described with reference to FIG. 22.

FIGS. 22(A) and 22(B) illustrate examples of scheduling for the terminal devices 2030-1 and 2030-2, respectively. Downlink/uplink scheduling information illustrated in FIG. 22(A) indicates uplink scheduling information to be transmitted by the scheduling information generation unit 2113 of the small cell base station device 2010 to the terminal device 2030-1. The transmission resource block group displayed on the right side of FIG. 21(A) includes a plurality of resource blocks indicated by the uplink scheduling information. Flg 0 of a first subframe indicates flag 0 indicating the continuation of the transmission of the uplink data using the assigned resource block. FIG. 1 of a second subframe indicates flag 1 indicating the end of the transmission of the uplink data using the assigned resource block. The fact that data of the third subframe is indicated by a broken line indicates that there is resource block assignment also in the third subframe but no uplink data is transmitted. The scheduling information generation unit 2113 of the small cell base station device 2010 detects flag 0 added to the resource block in the first subframe among the plurality of resource blocks assigned to the terminal device 2030-1. The scheduling information generation unit 2113 determines to continue the reception of uplink data using a resource block within a subsequent subframe by detecting flag 0. The scheduling information generation unit 2113 determines to end the reception of uplink data using a resource block within the second subframe by detecting flag 1 added to the resource block within the second subframe. Then, the scheduling information generation unit 2113 determines that the resource block within the third subframe assigned to the terminal device 2030-1 is not used for transmission of uplink data.

The scheduling information generation unit 2113 assigns a plurality of resource blocks to the terminal device 2030-2 other than the terminal device 2030-1 so that the plurality of resource blocks include a resource block within the third subframe. Downlink/uplink scheduling information of FIG. 22(B) indicates uplink scheduling information to be transmitted by the scheduling information generation unit 2113 of the small cell base station device 2010 to the terminal device 2030-2. A transmission resource block group displayed on the right side of FIG. 22(B) includes three resource blocks indicated by the uplink scheduling information. FIG. 22(B) illustrates a case in which flag 1 is set immediately after the LBT period of the second subframe in which flag 0 is set immediately after an LBT period of the first subframe among resource blocks within three subframes assigned to the terminal device 2030-2. The resource block within the first subframe assigned to the terminal device 2030-2 corresponds to the resource block within the third subframe unused by the terminal device 2030-1. The scheduling information generation unit 2113 of the small cell base station device 2010 determines that the resource block within the third subframe assigned to the terminal device 2030-2 is not used for transmission of uplink data. The scheduling information generation unit 2113 can assign a resource block within the third subframe for the next uplink data transmission by the terminal device 2030-1 or uplink data transmission by still another terminal device 2030.

(Scheduling Process)

Next, a scheduling process of the small cell base station device 2010 according to the present embodiment will be described. FIG. 23 is a flowchart illustrating an example of a scheduling process to be performed by the small cell base station device 2010 according to the present embodiment.

(Step S2101) The scheduling information generation unit 2113 of the small cell base station device 2010 assigns a plurality of resource blocks to the terminal device 2030-1 that is one of a plurality of connected terminal devices 2030. The scheduling information generation unit 2113 transmits uplink scheduling information indicating the assigned resource blocks to the terminal device 2030-1. Thereafter, the process proceeds to the processing of step S2102.

(Step S2102) The scheduling information generation unit 2113 receives uplink data transmitted using the resource blocks assigned to the terminal device 2030-1 and an uplink data end flag added to the resource block for each subframe. Thereafter, the process proceeds to the processing of step S2103.

(Step S2103) The scheduling information generation unit 2113 determines whether or not a value of the received uplink data end flag is 1 (Flg=1). In a case that the value is determined to be 1 (YES in step S2103), the process proceeds to the processing of step S2104. In a case that the value is determined to be 0 (NO in step S2103), the process returns to the processing of step S2102.

(Step S2104) The scheduling information generation unit 2113 determines whether or not an unused resource block remains without being used for uplink data transmission among the resource blocks assigned to the terminal device 2030-1. In a case that it is determined that an unused resource block remains (step S2104 YES), the scheduling information generation unit 2113 proceeds to the processing of step S2105. In a case that it is determined that no unused resource block remains (step S2104 NO), the process illustrated in FIG. 23 ends.

(Step S2105) The scheduling information generation unit 2113 assigns an unused resource block to the terminal device 2030-2 other than the terminal device 2030-1. A plurality of resource blocks including the unused resource block are assigned to the terminal device 2030-2. Thereafter, the process illustrated in FIG. 23 ends.

As described above, the terminal device 2030 includes the scheduling information processing unit 2311 configured to acquire uplink data scheduling information from the base station device. Also, the terminal device 2030 includes the transmission determination unit 2314 configured to determine whether or not to transmit uplink data by using a resource block specified by the scheduling information based on reception power measured every predetermined period and add an end flag indicating the end to a resource block in which transmission of the uplink data ends.

Also, the scheduling information generation unit 2113 of the base station device identifies an unused resource block based on the end flag added to the resource block assigned to at least one terminal device 2030 and indicating the end of the transmission of the uplink data.

According to this configuration, the scheduling information generation unit 2113 can detect the end of the uplink data transmitted using the resource block assigned to the terminal device 2030 and immediately identify an unused resource block that is not used for the transmission of the uplink data without performing complicated analysis on characteristics of the uplink data. Thus, effective utilization of unused resource blocks is promoted.

Although the third and fourth embodiments of the present invention have been described above in detail with reference to the drawings, specific configurations are not limited to the above-described embodiments and various design modifications and the like can also be made without departing from the scope of the present invention.

For example, the configuration of the communication system 2001 according to the fourth embodiment may be combined with the communication system 2001 according to the third embodiment. For example, the transmission determination unit 2314 of the terminal device 2030 according to the third embodiment may further include a configuration similar to that of the transmission determination unit 2314 of the terminal device according to the fourth embodiment. The scheduling information generation unit 2113 of the small cell base station device 2010 according to the third embodiment may further include a configuration similar to that of the scheduling information generation unit 2113 according to the fourth embodiment.

Also, the communication system 2001 according to the above-described embodiment is not limited to the LAA system that mainly performs communication using the LAA scheme, and can also be configured as a standalone type unlicensed band LTE system. The standalone type unlicensed band LTE system is an LTE system using only an unlicensed band as a frequency band of radio waves to be used for transmitting and receiving various types of data. In this case, the macrocell base station device 2020 may be omitted in the communication system 2001 and the primary cell reception unit 2321 and the primary cell transmission unit 2322 may be omitted in the terminal device 2030. Also, in the communication system 2001, the primary cell reception unit of the macrocell base station device 2020 and the primary cell reception unit 2321 of the terminal device 2030 may receive the transmitted radio waves of the unlicensed band as a received signal. At this time, the primary cell transmission unit of the macrocell base station device 2020 and the primary cell transmission unit 2322 of the terminal device 2030 transmit a transmission signal as the radio waves of the unlicensed band.

In addition, the communication system 2001 is applicable to a communication system in which the base station device schedules uplink data of the terminal device 2030 and the terminal device 2030 transmits the uplink data by using a resource block assigned according to scheduling, such as LTE. The communication system 2001 can be applied regardless of whether an unlicensed band or a licensed band is used for transmitting and receiving various types of data.

Also, the communication system 2001 may be applied to other wireless communication systems in which the base station device performs scheduling of uplink data and the terminal device transmits the uplink data by using radio waves of an unlicensed band based on the scheduling.

Also, although an example in which a dynamic scheduling method is applied as a scheduling scheme has been described in the above-described embodiment, the present invention may be applied to a scheduling scheme in which resource blocks intermittently determined between subframes are used for transmission. Dynamic scheduling is a technique of determining a resource block for each subframe. For example, a semi-persistent scheduling (SPS) scheme is available as a scheduling scheme to be used in transmission of a resource block intermittently determined between subframes.

In this case, the scheduling information generation unit of the small cell base station device 2010 or the macrocell base station device 2020 assigns resource blocks to each terminal device 2030 for each of a plurality of subframes.

Also, the above-described embodiments can be performed in the following aspects.

(1) A base station device including a communication unit configured to communicate with a plurality of terminal devices and a control unit, wherein the control unit assigns resource blocks to a first terminal device that is any one of the plurality of terminal devices, identifies at least one of unused resource blocks that are unused by the first terminal device among the assigned resource blocks, and assigns at least one of the identified unused resource blocks to another terminal device different from the first terminal device.

(2) The base station device according to (1), wherein the control unit receives uplink data transmitted by the first terminal device via the communication unit and identifies the unused resource block based on additional information added to the uplink data.

(3) The base station device according to (2), wherein the additional information is additional information indicating that the first terminal device does not use a resource block after a resource block used in the transmission of the uplink data among the resource blocks assigned to the first terminal device.

(4) The base station device according to any one of (1) to (3), wherein the control unit identifies the unused resource block based on the number of resource blocks used in transmission of the uplink data by the first terminal device among the resource blocks assigned to the first terminal device.

(5) A terminal device including a communication unit configured to communicate with a base station device and a control unit, wherein, in a case that uplink data is transmitted to the base station device via the communication unit by using at least one of resource blocks assigned by the base station device, in a case that there is no uplink data to be transmitted other than the uplink data, the control unit adds additional information indicating that the terminal device does not use a resource block in transmission after the resource block used in the transmission of the uplink data to the uplink data.

(6) A communication system including a base station device and a plurality of terminal devices, wherein the base station device includes a communication unit configured to communicate with a plurality of terminal devices and a control unit, wherein the control unit assigns resource blocks to a first terminal device that is any one of the plurality of terminal devices, identifies at least one of unused resource blocks that are unused by the first terminal device among the assigned resource blocks, and assigns at least one of the identified unused resource blocks to another terminal device different from the first terminal device, wherein each of the plurality of terminal devices includes a communication unit configured to communicate with the base station device and a control unit, and wherein, in a case that uplink data is transmitted to the base station device via the communication unit by using at least one of resource blocks assigned by the base station device, in a case that there is no uplink data to be transmitted other than the uplink data, the control unit adds additional information indicating that the terminal device of the control unit does not use a resource block in transmission after the resource block used in the transmission of the uplink data to the uplink data.

(7) A communication method for use in a base station device configured to communicate with a plurality of terminal devices, the communication method including: a process of assigning resource blocks to a first terminal device that is any one of the plurality of terminal devices; a process of identifying at least one of unused resource blocks that are unused by the first terminal device among the assigned resource blocks; and a process of assigning at least one of the identified unused resource blocks to another terminal device different from the first terminal device.

(8) A program for causing a computer of a base station device configured to communicate with a plurality of terminal devices to execute: a procedure of assigning resource blocks to a first terminal device that is any one of the plurality of terminal devices; a procedure of identifying at least one of unused resource blocks that are unused by the first terminal device among the assigned resource blocks; and a procedure of assigning at least one of the identified unused resource blocks to another terminal device different from the first terminal device.

Also, a part of the small cell base station device 2010, the macrocell base station device 2020, and the terminal device 2030 in the above-described embodiments, for example, the control unit 2011, the control unit 2031, all thereof, or the like may be configured to be implemented by a computer. In this case, the control functions may be implemented by recording a program for implementing the control functions on a computer-readable recording medium and causing a computer system to read and execute the program recorded on the recording medium.

Also, it is assumed that the "computer system" described here is a computer system embedded in the small cell base station device 2010, the macrocell base station device 2020, and the terminal device 2030 and includes an operating system (OS) and hardware such as peripheral devices. Also, the "computer-readable recording medium" refers to a storage device including a flexible disk, a magneto-optical disc, a ROM, a portable medium such as a CD-ROM, and a hard disk embedded in the computer system.

Further, the "computer-readable recording medium" is assumed to include a computer-readable recording medium for dynamically holding a program for a short time as in a communication line in a case that the program is transmitted via a network such as the Internet or a communication circuit such as a telephone circuit and a computer-readable recording medium for holding the program for a predetermined time as in a volatile memory inside the computer system including a server and a client in a case that the program is transmitted. Also, the above-described program may be used to implement some of the above-described functions. Further, the program may implement the above-described functions in combination with a program already recorded on the computer system.

Also, the small cell base station device 2010, the macrocell base station device 2020, and the terminal device 2030 in the above-described embodiments may be implemented as an integrated circuit such as large scale integration (LSI). Each of the functional blocks of the terminal device 2030 may be individually formed as a processor or a part or all thereof may be integrated into a processor. Also, a technique of forming an integrated circuit is not limited to LSI, and may be implemented by a dedicated circuit or a general-purpose processor. Also, in a case that the technology of an integrated circuit with which LSI is replaced emerges with the advancement of semiconductor technology, the integrated circuit based on the technology may be used.

INDUSTRIAL APPLICABILITY

Some aspects of the present invention can be applied to a communication system, a base station device, a terminal device, a communication method, a program, and the like required to improve utilization efficiency of radio resources.

DESCRIPTION OF THE REFERENCE SYMBOLS

1001, 1001A Communication system
C1001, C1002 Cell
CN1001 Core network
1010, 1010A Small cell base station device
1020 Macrocell base station device
1030 Terminal device
1011, 1011A First communication unit
1111 Secondary cell reception unit
1112 Secondary cell transmission unit
1113, 1315 Interference reception unit
1012 Second communication unit
1013, 1013A, 1032, 1032A Control unit
1131 Scheduling control unit
1132 Terminal identification unit
1133 Signal demodulation unit
1134, 1324 Sensing processing unit
1135, 1325 Transmission determination unit
1321 Scheduling processing unit
1322 Transmission data generation unit
1323 Reference signal addition unit
1111A, 1311A Reception unit
1112A, 1312A Transmission unit
1031, 1031A Communication unit
2001 Communication system
2010 Small cell base station device
2011 Control unit
2012 First communication unit
2013 Second communication unit
2020 Macrocell base station device
2030 (2030-1, 2030-2) Terminal device
2031 Control unit
2032 Communication unit
2111 Signal demodulation unit
2112 Sensing processing unit
2113 Scheduling information generation unit
2114 Transmission determination unit
2121 Secondary cell reception unit
2122 Secondary cell transmission unit
2123 Interference reception unit 2311 Scheduling information processing unit
2312 Sensing processing unit
2313 Transmission data generation unit
2314 Transmission determination unit
2321 Primary cell reception unit
2322 Primary cell transmission unit
2323 Secondary cell reception unit
2324 Secondary cell transmission unit
2325 Interference reception unit

The invention claimed is:

1. A communication system for improving utilization efficiency of radio resources, the communication system comprising a base station device and first and second terminal devices that communicate with the base station device,
wherein the base station device comprises:
a first communication unit that communicates with the first and second terminal devices; and
a first control unit that assigns radio resources including at least one or more resource blocks to both of the first and second terminal devices, the at least one or more resource blocks being able to be used by one of the first and second terminal devices,
wherein the first control unit identifies at least one of unused resource blocks that is unused by the first terminal device among the at least one or more resource blocks of the radio resources assigned, and assigns the identified at least one of the unused resource blocks to the second terminal device different from the first terminal device,
wherein the first and second terminal devices comprise:
a second communication unit that communicates with the base station device; and
a second control unit that transmits transmission data, to the base station device, by using the at least one or more resource blocks of the radio resources assigned by the first control unit,
wherein, in a case that uplink data is transmitted to the base station device via the second communication unit by using the at least one or more resource blocks of the radio resources assigned by the base station device, when there is no uplink data to be transmitted other than the uplink data, the second control unit adds additional information indicating that the terminal device associated with the second control unit does not use a resource block in transmission after the at least one or more resource blocks used in the transmission of the uplink data.

2. The communication system according to claim 1, wherein the base station device comprises a reception processing unit that demodulates received signals from the first and second terminal devices.

3. The communication system according to claim 2, wherein the second control unit adds a reference signal separable for each of the first and second terminal devices to the transmission data, and
wherein the reception processing unit separates the transmission data to which the reference signal is added from the received signal based on the reference signal.

4. The communication system according to claim 2, wherein the reception processing unit reduces interference in the first and second terminal devices in a case that the received signals from the first and second terminal devices are included within a resource block to be demodulated.

5. The communication system according to claim 4, wherein the reception processing unit demodulates received signals from the first or second terminal device included in resource blocks to be demodulated in a case that the received signals from the first and second terminal devices are not included in the resource blocks to be demodulated.

6. The communication system according to claim 2, wherein the first control unit performs control for transmitting common scheduling information to the first and second terminal devices by using a common control channel for the first and second terminal devices.

7. The communication system according to claim 2, wherein the first control unit sets an upper limit of the number of terminal devices, which include the first and second terminal devices, to which the radio resources are assigned based on a predetermined criterion.

8. The communication system according to claim 7, wherein the predetermined criterion is whether or not the reception processing unit is able to reduce interference in the first and second terminal devices.

9. The communication system according to claim 2, wherein the first control unit determines the first and second terminal devices to which the radio resources are assigned based on locations of the first and second terminal devices.

10. The communication system according to claim 2, wherein the first control unit determines the first and second terminal devices to which the radio resources are assigned based on quality information received from the first and second terminal devices.

11. The communication system according to claim 1, wherein the number of the at least one or more resource blocks of the radio resources assigned by the first control unit of the base station device is greater than the number of resource blocks required by the first or second terminal device.

12. A terminal device for improving utilization efficiency of radio resources, the terminal device being any one of first and second terminal devices for communicating with a base station device, the terminal device comprising:
a communication unit that communicates with the base station device; and
a control unit that transmits, to the base station device, transmission data by using at least one or more resource blocks of the radio resources assigned, from the base station device, to both of the first and second terminal devices, the at least one or more resource blocks being able to be used by one of the first and second terminal devices,
wherein, in a case that uplink data is transmitted to the base station device via the communication unit by using the at least one or more resource blocks of the radio resources assigned by the base station device, when there is no uplink data to be transmitted other than the uplink data, the control unit adds additional information to the uplink data, the additional information indicating that the terminal device associated with the control unit does not use a resource block in transmission after the resource block used in the transmission of the uplink data.

13. The terminal device according to claim 12, the terminal device comprising:
a transmission control unit that transmits transmission data by using at least some of the radio resources.

14. A communication method of improving utilization efficiency of radio resources in a base station device and first and second terminal devices, the communication method comprising:
assigning, by the base station device, radio resources including at least one or more resource blocks to both of the first and second terminal devices, the at least one or more resource blocks being able to be used by one of the first and second terminal devices;

identifying, by the base station device, at least one of unused resource blocks that is unused by the first terminal device among the at least one or more resource blocks of the radio resources assigned;

assigning, by the base station device, the identified at least one of the unused resource blocks to the second terminal device different from the first terminal device;

transmitting, by at least one of the first and second terminal devices, transmission data, to the base station device, by using the at least one or more resource blocks of the radio resources assigned by the base station device; and adding, in a case that uplink data is transmitted to the base station device by the at least one of the first and second terminal devices via using the at least one or more resource blocks of the radio resources assigned by the base station device, when there is no uplink data to be transmitted other than the uplink data, additional information indicating that the at least one of the first and second terminal devices does not use a resource block in transmission after the resource block used in the transmission of the uplink data.

15. The communication method according to claim 14, the communication method comprising:

demodulating, by the base station device, received signals from the first and second terminal devices.

* * * * *